(12) United States Patent
Hoh et al.

(10) Patent No.: US 12,314,993 B2
(45) Date of Patent: May 27, 2025

(54) METHODS AND SYSTEMS FOR IDENTIFYING UNDERUSED PROPERTIES AND UTILIZING UNDERUSED PROPERTIES BY LEVERAGING MOBILE UNITS

(71) Applicant: Toyota Motor Engineering & Manufacturing North America, Inc., Plano, TX (US)

(72) Inventors: Baik Hoh, Mountain View, CA (US); Kentaro Oguchi, Mountain View, CA (US); John F. Daly, Frisco, TX (US); Akio Orii, Redwood City, CA (US); Satoshi Nagashima, Long Island City, NY (US); Adrian Lombard, Royal Oak, MI (US); Paul Li, Mountain View, CA (US); Kruti Vekaria, Arlington, VA (US)

(73) Assignees: Toyota Motor Engingeering & Manufacturing North America, Inc., Plano, TX (US); Toyota Jidosha Kabushiki Kaisha, Aichi-ken (JP)

(*) Notice: Subject to any disclaimer, the term of this patent is extended or adjusted under 35 U.S.C. 154(b) by 241 days.

(21) Appl. No.: 17/728,465

(22) Filed: Apr. 25, 2022

(65) Prior Publication Data
US 2022/0343413 A1 Oct. 27, 2022

Related U.S. Application Data

(60) Provisional application No. 63/180,469, filed on Apr. 27, 2021.

(51) Int. Cl.
*G06Q 30/0645* (2023.01)
*G01C 21/00* (2006.01)
(Continued)

(52) U.S. Cl.
CPC ..... *G06Q 30/0625* (2013.01); *G01C 21/3811* (2020.08); *G06Q 30/0201* (2013.01);
(Continued)

(58) Field of Classification Search
CPC .......... G06Q 30/0625; G06Q 30/0201; G06Q 30/0645; G06Q 50/163; G01C 21/3811; G06K 7/10366; G06V 20/13
See application file for complete search history.

(56) References Cited

U.S. PATENT DOCUMENTS 6,023,687 A 2/2000 Weatherly et al.
9,456,309 B2 9/2016 Zises
(Continued)

FOREIGN PATENT DOCUMENTS

CN 102467734 B 7/2015
CN 107230139 A 10/2017
(Continued)

OTHER PUBLICATIONS www.campsot.com, as found on the Way Back Machine web archive, Jul. 20, 2020 (Year: 2020).*
(Continued)

*Primary Examiner* — Carrie S Gilkey
(74) *Attorney, Agent, or Firm* — Dinsmore & Shohl LLP

(57) ABSTRACT

In one embodiment, a system includes a controller. The controller is configured to perform operations including obtaining data about an area related to a user, determining vacancy information about the area based on the data, determining at least one of an accessibility and a usability of the area, determining that the area is available for occupancy by one or more mobile units based on the vacancy information and at least one of the accessibility and the usability (Continued)

of the area, and updating a map including the area with an indication that the area is available for occupancy by one or more mobile units.

17 Claims, 17 Drawing Sheets

(51) Int. Cl.
*G06Q 30/0201* (2023.01)
*G06Q 30/0601* (2023.01)
*G06Q 50/163* (2024.01)
*G06V 20/13* (2022.01)

(52) U.S. Cl.
CPC ....... *G06Q 30/0645* (2013.01); *G06Q 50/163* (2013.01); *G06V 20/13* (2022.01)

(56) References Cited

U.S. PATENT DOCUMENTS

| | | | |
|---|---|---|---|
| 9,830,724 | B2 | 11/2017 | Ghosh et al. |
| 10,163,094 | B2 | 12/2018 | Smith |
| 10,387,811 | B2 | 8/2019 | Carnevale et al. |
| 10,519,647 | B2 | 12/2019 | Crozier |
| 10,540,702 | B2 | 1/2020 | Conforti |
| 10,977,701 | B2 * | 4/2021 | Crutchfield, Jr. .. G06Q 30/0641 |
| 2005/0098627 | A1 * | 5/2005 | Chase ................ G06Q 30/0226 |
| | | | 235/382 |
| 2008/0262879 | A1 | 10/2008 | Furlong et al. |
| 2012/0245966 | A1 * | 9/2012 | Volz ..................... G05B 19/048 |
| | | | 705/5 |
| 2013/0117695 | A1 | 5/2013 | Hammound |
| 2015/0235333 | A1 | 8/2015 | Bangerter et al. |
| 2016/0148406 | A1 | 5/2016 | Ghosh et al. |
| 2019/0188782 | A1 | 6/2019 | Howard et al. |
| 2021/0182916 | A1 * | 6/2021 | Norby ................... G06Q 20/18 |

FOREIGN PATENT DOCUMENTS

| | | |
|---|---|---|
| CN | 208009943 U | 10/2018 |
| CN | 110821214 A | 2/2020 |
| CN | 110861866 A | 3/2020 |
| CN | 111827730 A | 10/2020 |
| GB | 2544871 A | 5/2017 |
| KR | 101137024 B1 | 4/2012 |
| KR | 1020150133409 A | 11/2015 |
| KR | 1020200081705 A | 7/2020 |
| KR | 1020210029051 A | 3/2021 |
| WO | 2019153270 A1 | 8/2019 |

OTHER PUBLICATIONS

PODS, "Starting a Pop-up Shop with a PODS Container", Online article, URL: https://www.pods.com/business/solutions/pop-up-shops.
PODS, "Moving Help with PODZILLA", Online article, URL: https://www.pods.com/podzilla.

* cited by examiner

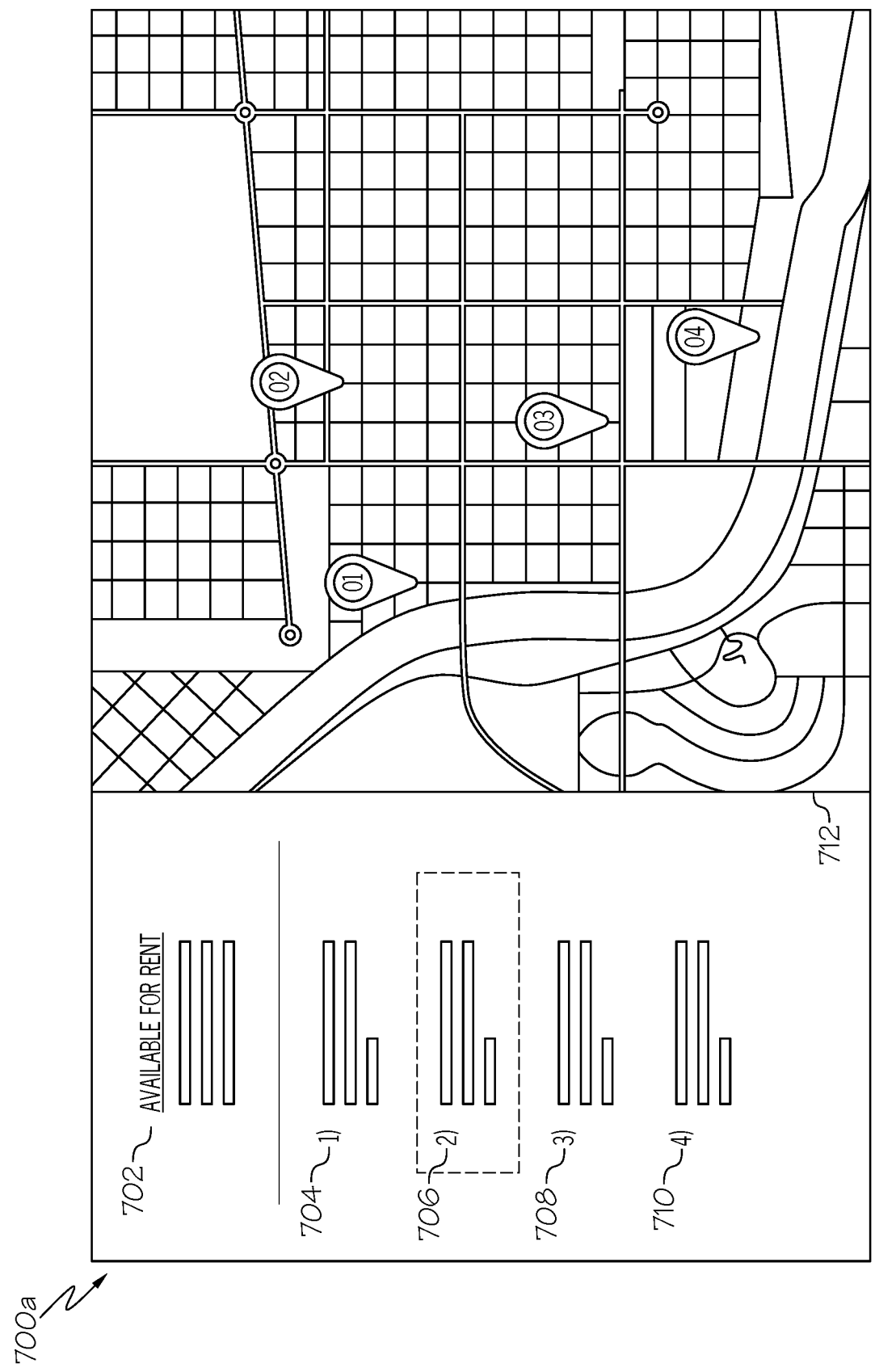

METHODS AND SYSTEMS FOR IDENTIFYING UNDERUSED PROPERTIES AND UTILIZING UNDERUSED PROPERTIES BY LEVERAGING MOBILE UNITS

CROSS-REFERENCE TO RELATED APPLICATION

This application claims benefit of U.S. Provisional Application No. 63/180,469 filed on Apr. 27, 2021, the contents of which are herein incorporated by reference.

TECHNICAL FIELD

The present specification relates to systems and methods for identifying underused properties and utilizing underused properties by leveraging mobile units, and more particularly, to systems and methods for installing temporary mobile structures using a plurality of mobile units on the underused properties in order to increase utilization of the underused properties.

BACKGROUND

As online retail stores exponentially grow, many brick-and-mortar retailers are forced to close their doors and retail landlords end up having underutilized space, e.g., underutilized parking lots, underused premises, and the like.

Accordingly, a need exists for providing a method and system for utilizing the underutilized properties.

SUMMARY

The present disclosure provides systems and methods for identifying underused properties and installing temporary mobile structures using a plurality of mobile units on the underused properties in order to increase utilization of the underused properties.

In one embodiment, a system includes a controller. The controller is configured to perform operations including obtaining data about an area related to a user, determining vacancy information about the area based on the data, determining at least one of an accessibility and a usability of the area, determining that the area is available for occupancy by one or more mobile units based on the vacancy information and at least one of the accessibility and the usability of the area, and updating a map including the area with an indication that the area is available for occupancy by one or more mobile units.

In another embodiment, a system includes a plurality of mobile units and a controller. The controller is configured to perform operations including generating map information including information about an area of a user, receiving a theme for the area from the user, determining whether a plurality of users required for the theme are registered to the area, and instructing the plurality of mobile units including mobile structures selected by the plurality of users to move to the area in response to determining that the plurality of users required for the theme are registered to the area.

In yet another embodiment, a system includes a plurality of mobile units and a controller. The controller is configured to perform operations including identifying one or more areas where a complex structure fits, the complex structure comprising a plurality of mobile structures, receiving a selection of an area among the identified one or more areas, and instructing the plurality of mobile units carrying the plurality of mobile structures to move to the area.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which:

FIG. 7A depicts a GUI for a retailer showing a map with a set of properties available for rent that may be rented by the retailer, according to one or more embodiments shown and described herein;

DETAILED DESCRIPTION

The present disclosure is directed to methods and systems for providing flexible retail model in the physical world. A mobile unit, or an agile space, is a new mobility concept that rethinks the use and provisioning of space, both indoors and outdoors, with multiple usage applications. The present disclosure is to bring great experiences to people by providing customized, efficiently packaged spaces created to address societal challenges. The mobile unit may be a portable retail showroom and promote retailers' brands and products in different venues without the need of long-term commercial lease contracts.

The present disclosure provides the creation of a two-way marketplace, one in which retailers can promote their products and brands in new environments while landlords can leverage and monetize space that is underutilized, i.e., a win-win situation for both retailers and landlords. The present methods and systems help make the retail ecosystem more dynamically responsive to consumer needs. With a more agile retail space, retailers can more freely enter a broader array of venues and test out locations without committing to them long-term. Landlords can experiment with a greater variety of brand and service options to draw foot traffic, which is often a challenge in traditional brick-and-mortar retail environments. Consumers benefit from being served the best possible retail experience.

Figure 1:
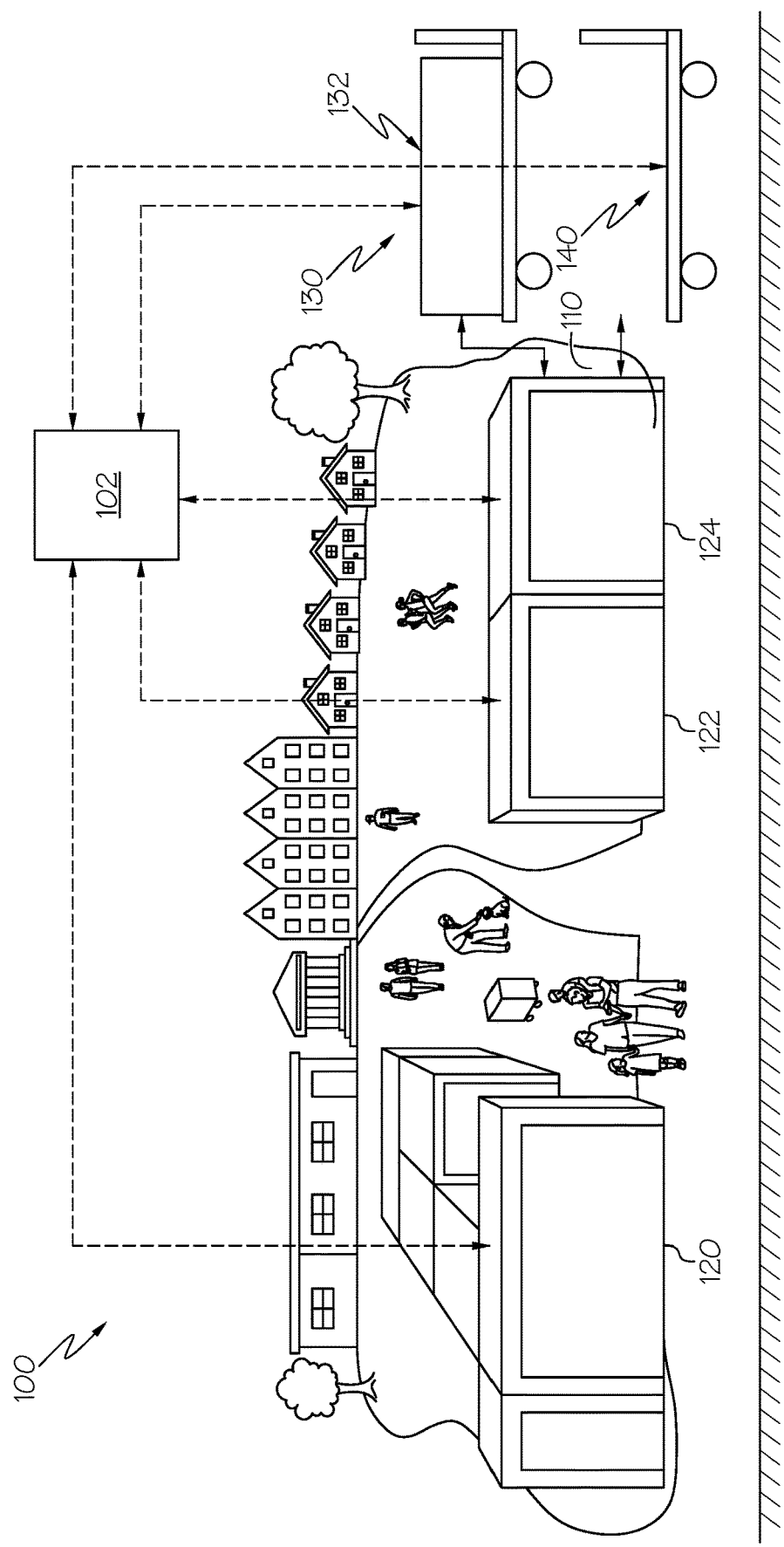
FIG. 1 schematically depicts a system for placing and removing mobile structures on unoccupied properties, according to one or more embodiments shown and described herein.

FIG. 1 schematically depicts a system for placing and removing mobile structures on unoccupied properties, according to one or more embodiments shown and described herein.

By referring to FIG. 1, a system 100 includes a server 102, mobile structures 120, 122, 124, and mobile units 130, 140. The server 102 may identify that a property 110 has been unoccupied or underused for an extended period of time. The property 110 may be, for example, an underutilized parking lot, an underused premise, and the like. The landlord of the property 110 may register the property into a platform operated by the server 102. The server 102 may include the property 110 in an inventory as a property available for renting for a certain period of time. Users, such as retailers, that are registered to the platform operated by the server 102 may receive information about the property 110, and request placing mobile structures on the property 110. For example, in FIG. 1, mobile structures 120, 122, 124 are placed on the property. Each user may request one or more mobile structures to be placed on the property 110. For example, a first user may request a plurality of structures 120 to be placed on the property 110. A second user may request the structure 122 to be placed on the property 110 and a third user may request the structure 124 to be placed on the property. In response to the request, the server 102 may instruct the mobile units 130, 140 to deliver and place requested mobile structures on the property 110.

In embodiments, information about who is currently on the property 110 or who will be on the property 110 may be available to the users registered to the platform. For example, when the mobile structures 120 and 122 of the first user and the second user are placed on the property 110 or are to be placed on the property 110 for a designated period of time, the information about the first user and the second user along with the designated period of time may be available to the third user such that the third user may determine whether or not to order a mobile structure to be placed on the property 110. The information about the first user and the second user may include information about business run by the first and second users, the number of mobile structures to be used by the first and second users, the shape and size of the structures, and so on.

The system 100 includes mobile units 130 and 140 that may deliver the mobile structures from one place to another. For example, the mobile unit 130 includes a mobile structure 132. The mobile unit 130 may deliver and place the mobile structure 132 on the property 110 in response to an instruction from the server 102 that there is a demand for placing the mobile structure 132 on the property 110. The mobile unit 140 may not include a mobile structure. The mobile unit 140 may move to the property 110 and remove one of the mobile structures 120, 122, 124 in response to an instruction from the server 102. While FIG. 1 depicts two mobile units, more or less than two mobile units may deliver and pick up the mobile structures.

The server 102 may be a remote server or a local server including, but not limited to, a roadside unit, an edge server, and the like. While FIG. 1 depicts a single server, the present system may include a plurality of servers that are distributed over a larger area managed by the servers.

Each of the mobile units 130, 140 may be a vehicle including an automobile or any other passenger or non-passenger vehicle such as, for example, a terrestrial, aquatic, and/or airborne vehicle. In some embodiment, one or more of the mobile units 130, 140 may be an unmanned aerial vehicle (UAV), commonly known as a drone, that may be able to deliver relatively small and light items to the mobile structures on the property 110.

Each of the mobile units 130, 140 may be an autonomous and connected vehicle that navigates its environment with limited human input or without human input. Each of the mobile units 130, 140 may be equipped with internet access and share data with other devices both inside and outside the mobile units 130, 140. Each of the mobile units 130, 140 may communicate with the server 102 and transmits its data to the server 102. For example, each of the mobile units 130, 140 transmits information about its current location and destination, information about the mobile structure that it is currently carrying, information about a task that it is currently implementing, and the like.

In some embodiments, a plurality of mobile units may move together to a property, e.g., by forming a vehicle platoon, when there is a placement order of bulk mobile structures, or a removal order of bulk mobile structures at the same property.

Figure 2:
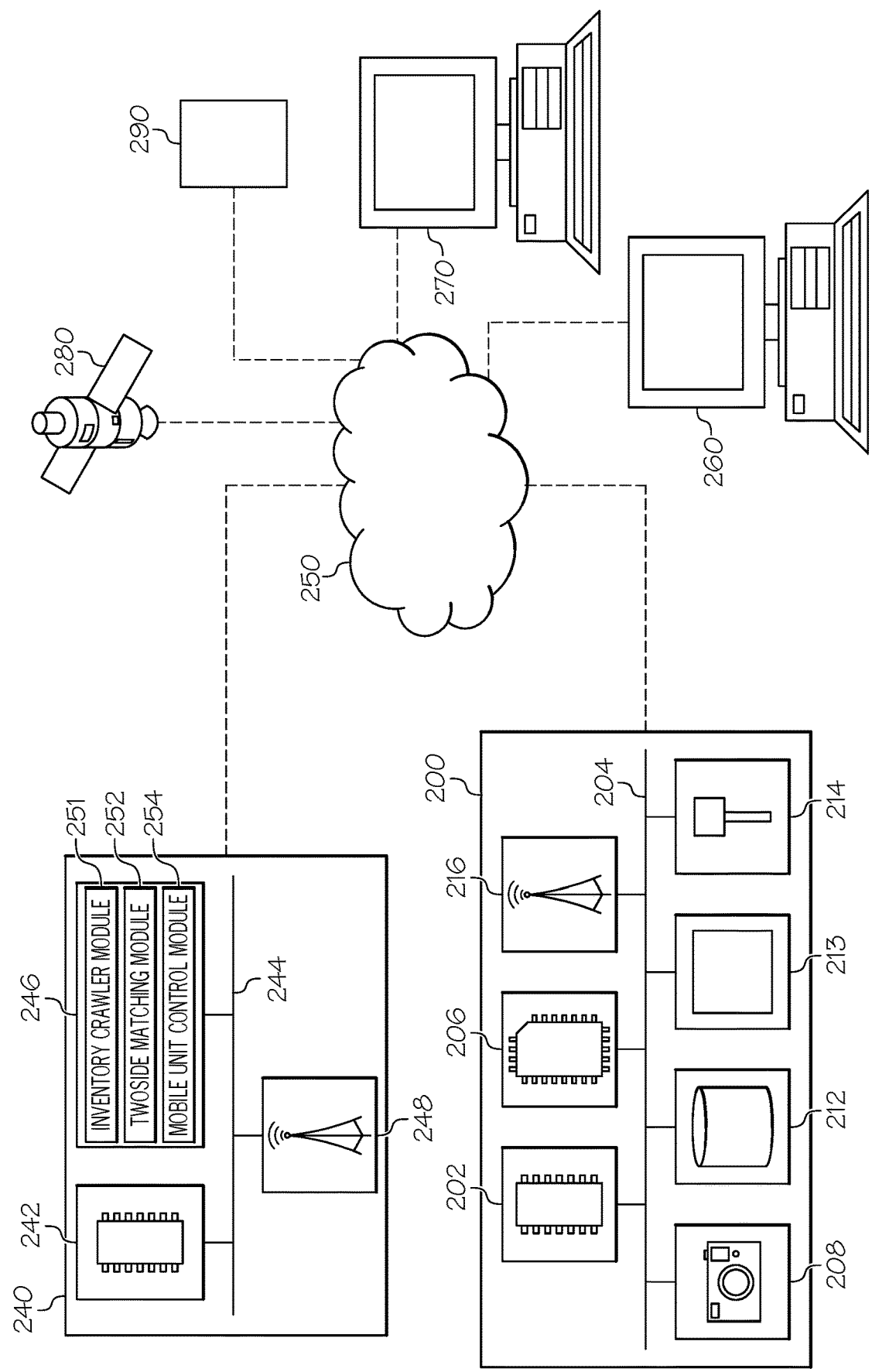
FIG. 2 schematically depicts a system for identifying underused properties, and placing and removing mobile structures on the properties, according to one or more embodiments shown and described herein.

FIG. 2 schematically depicts a system for identifying underused properties, and placing and removing mobile structures on the properties, according to one or more embodiments shown and described herein. The system includes a mobile unit system 200, a server 240, a first computing device 260, a second computing device 270, a satellite 280, and a second server 290.

It is noted that, while the mobile unit system 200 is depicted in isolation, the mobile unit system 200 may be included within a vehicle in some embodiments, for example, within the mobile unit 130 of FIG. 1. In embodiments in which the mobile unit system 200 is included within a vehicle, the vehicle may be an automobile or any other passenger or non-passenger vehicle such as, for example, a terrestrial, aquatic, and/or airborne vehicle. In some embodiments, the vehicle is an autonomous vehicle that navigates its environment with limited human input or without human input.

The mobile unit system 200 includes one or more processors 202. Each of the one or more processors 202 may be any device capable of executing machine readable and executable instructions. Accordingly, each of the one or more processors 202 may be a controller, an integrated circuit, a microchip, a computer, or any other computing device. The one or more processors 202 are coupled to a communication path 204 that provides signal interconnectivity between various modules of the system. Accordingly, the communication path 204 may communicatively couple any number of processors 202 with one another, and allow the modules coupled to the communication path 204 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 204 may be formed from any medium that is capable of transmitting a signal such as, for example, conductive wires, conductive traces, optical waveguides, or the like. In some embodiments, the communication path 204 may facilitate the transmission of wireless signals, such as WiFi, Bluetooth®, Near Field Communication (NFC) and the like. Moreover, the communication path 204 may be formed from a combination of mediums capable of transmitting signals. In one embodiment, the communication path 204 comprises a combination of conductive traces, conductive wires, connectors, and buses that cooperate to permit the transmission of electrical data signals to components such as processors, memories, sensors, input devices, output devices, and communication devices. Accordingly, the communication path 204 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The mobile unit system 200 includes one or more memory modules 206 coupled to the communication path 204. The one or more memory modules 206 may comprise RAM, ROM, flash memories, hard drives, or any device capable of storing machine readable and executable instructions such that the machine readable and executable instructions can be accessed by the one or more processors 202. The machine readable and executable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable and executable instructions and stored on the one or more memory modules 206. Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

Referring still to FIG. 2, the mobile unit system 200 comprises one or more sensors 208. The one or more sensors 208 may be any device having an array of sensing devices capable of detecting radiation in an ultraviolet wavelength band, a visible light wavelength band, or an infrared wavelength band. The one or more sensors 208 may be imaging sensors having any resolution. In some embodiments, one or more optical components, such as a mirror, fish-eye lens, or any other type of lens may be optically coupled to the one or more sensors 208. In embodiments described herein, the one or more sensors 208 may provide navigation support. That is, data captured by the one or more sensors 208 may be used to autonomously or semi-autonomously navigate the mobile unit.

The one or more sensors 208 may include one or more cameras that collect data about incoming or outgoing traffic of customers in the mobile structure that is placed on a property. The one or more sensors 208 may include sensors that collects average staying time of each customer in the mobile structure. Further, the one or more sensors 208 may include sensors that collect data about customers interacting with a screen 213 or include a near field communication chip that communicates with smartphones in the mobile structure.

The mobile unit system 200 comprises one or more vehicle sensors 212. Each of the one or more vehicle sensors 212 is coupled to the communication path 204 and communicatively coupled to the one or more processors 202. The one or more vehicle sensors 212 may include one or more motion sensors for detecting and measuring motion and changes in motion of the vehicle. The motion sensors may include inertial measurement units. Each of the one or more motion sensors may include one or more accelerometers and one or more gyroscopes. Each of the one or more motion sensors transforms sensed physical movement of the vehicle into a signal indicative of an orientation, a rotation, a velocity, or an acceleration of the vehicle.

The mobile unit system 200 comprises a screen 213 for providing visual output such as, for example, advertisements and the like. The screen 213 may be positioned on the interior or exterior of a mobile unit such that customers inside or outside the mobile structure of the mobile unit can see the screen 213 after the mobile structure is placed on a property. For example, the screen 213 may be positioned on the interior sidewall of a mobile structure. The screen 213 is coupled to the communication path 204. Accordingly, the communication path 204 communicatively couples the screen 213 to other modules of the mobile unit system 200 including, without limitation, the one or more processors 202 and/or the one or more memory modules 206. The screen 213 may include any medium capable of transmitting an optical output such as, for example, a cathode ray tube, a light emitting diode (LED) display, an organic light emitting diode (OLED) display, a liquid crystal display, a plasma display, or the like. In embodiments, the screen 213 may be a touchscreen that, in addition to visually displaying information, detects the presence and location of a tactile input upon a surface of or adjacent to the screen 213. Accordingly, each display may receive mechanical (e.g., touch) input directly upon the optical output provided by the screen. Additionally, it is noted that the screen 213 can include at least one of the one or more processors 202 and at least one of the one or memory modules 206.

The mobile unit system 200 comprises a satellite antenna 214 coupled to the communication path 204 such that the communication path 204 communicatively couples the satellite antenna 214 to other modules of the mobile unit system 200. The satellite antenna 214 is configured to receive signals from global positioning system satellites. Specifically, in one embodiment, the satellite antenna 214 includes one or more conductive elements that interact with electromagnetic signals transmitted by global positioning system satellites. The received signal is transformed into a data signal indicative of the location (e.g., latitude and longitude) of the satellite antenna 214 or an object positioned near the satellite antenna 214, by the one or more processors 202.

Still referring to FIG. 2, the mobile unit system 200 comprises network interface hardware 216 for communicatively coupling the mobile unit system 200 to the server 240. The network interface hardware 216 can be communicatively coupled to the communication path 204 and can be any device capable of transmitting and/or receiving data via a network. Accordingly, the network interface hardware 216 can include a communication transceiver for sending and/or receiving any wired or wireless communication. For example, the network interface hardware 216 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 216 includes hardware configured to operate in accordance with the Bluetooth® wireless communication protocol. The network interface hardware 216 of the mobile unit system 200 may transmit its data to the server 240. For example, the network interface hardware 216 of the mobile unit system 200 may transmit vehicle data, location data, and the like to other vehicles or the server 240.

The mobile unit system 200 may connect with one or more external vehicles and/or external processing devices (e.g., the server 240) via a direct connection. The direct connection may be a vehicle-to-vehicle connection ("V2V connection") or a vehicle-to-everything connection ("V2X connection"). The V2V or V2X connection may be established using any suitable wireless communication protocols discussed above. A connection between vehicles may utilize sessions that are time-based and/or location-based. In embodiments, a connection between vehicles or between a vehicle and an infrastructure element may utilize one or more networks to connect (e.g., the network 250), which may be in lieu of, or in addition to, a direct connection (such as V2V or V2X) between the vehicles or between a vehicle and an infrastructure. By way of non-limiting example, vehicles may function as infrastructure nodes to form a mesh network and connect dynamically on an ad-hoc basis. In this way, vehicles may enter and/or leave the network at will, such that the mesh network may self-organize and self-modify over time. Other non-limiting network examples include vehicles forming peer-to-peer networks with other vehicles or utilizing centralized networks that rely upon certain vehicles and/or infrastructure elements. Still other examples include networks using centralized servers and other central computing devices to store and/or relay information between vehicles.

Still referring to FIG. 2, the mobile unit system 200 may be communicatively coupled to the server 240 by the network 250. In one embodiment, the network 250 may include one or more computer networks (e.g., a personal area network, a local area network, or a wide area network), cellular networks, satellite networks and/or a global positioning system and combinations thereof. Accordingly, the mobile unit system 200 can be communicatively coupled to the network 250 via a wide area network, via a local area network, via a personal area network, via a cellular network, via a satellite network, etc. Suitable local area networks may include wired Ethernet and/or wireless technologies such as, for example, wireless fidelity (Wi-Fi). Suitable personal area networks may include wireless technologies such as, for example, IrDA, Bluetooth®, Wireless USB, Z-Wave, ZigBee, and/or other near field communication protocols. Suitable cellular networks include, but are not limited to, technologies such as LTE, WiMAX, UMTS, CDMA, and GSM.

Still referring to FIG. 2, the server 240 may correspond to the server 102 in FIG. 1. The server 240 includes one or more processors 242, one or more memory modules 246, network interface hardware 248, and a communication path 244. The one or more processors 242 may be a controller, an integrated circuit, a microchip, a computer, or any other computing device. The one or more memory modules 246 may comprise RAM, ROM, flash memories, hard drives, or any device capable of storing machine readable and executable instructions such that the machine readable and executable instructions can be accessed by the one or more processors 242. The communication path 244 may be similar to the communication path 204.

The one or more memory modules 246 may include an inventory crawler module 251, a two-sided matching module 252, and a mobile unit control module 254. Each of the inventory crawler module 251, the two-sided matching module 252, and the mobile unit control module 254 may be a program module in the form of operating systems, application program modules, and other program modules stored in one or more memory modules 246. In some embodiments, the program module may be stored in a remote storage device that may communicate with the server 102. Such a program module may include, but is not limited to, routines, subroutines, programs, objects, components, data structures and the like for performing specific tasks or executing specific data types as will be described below.

The inventory crawler module 251, when executed by the one or more processors 242, may identify underused areas, evaluate the identified underused areas considering various factors, and add the underused areas to an inventory if the underused areas meet certain requirements. For example, the inventory crawler module 251 obtain data related to an area, for example, satellite images of the area from a satellite 280, geographic information system (GIS) data of the area from the second server 290 which may be operated by government entities or private companies. Then, the inventory crawler module 251 determines vacancy information about the area based on the date related to the area, and determines accessibility and usability of the area. The accessibility of the area may be determined based on various factors including, but not limited to, whether the mobile unit carrying a mobile structure may access the area, information about a road for accessing the area (e.g., a size of the road, a curvature of the road, a loading/unloading space), parking spaces proximate to the area, a shape and/or size of the area, and the like. The usability of the area may be determined based on various factors including, but not limited to, information about co-tenants on the area or areas adjacent to the area, information about locations of facilities on the area (e.g., locations of restrooms, proximity to existing buildings), and the like.

Based on the vacancy information, accessibility, and usability of the area, the inventory crawler module 251 may evaluate whether the area is available for occupancy by one or more mobile structures. If it is determined that the area is available for occupancy by one or more mobile structures, the inventory crawler module 251 may update the status of the area and update a map with an indication that the area is available for occupancy by one or more mobile units.

The two-sided matching module 252, when executed by the one or more processors 242, may generate user interfaces for landlords and retailers and determine information about mobile structures to be placed on or removed from areas based on inputs from the landlords and retailers. The landlords and the retailers are registered to an online platform managed by the server 102. The landlords may input a list of their properties when they register to the online platform. The retailers may input information about business they are running when they register to the online platform. The user interfaces may be described in detail with reference to FIGS. 6A, 6B, 7A, 7B below. In embodiments, the two-sided matching module 252 generates map information for a first user (e.g., a landlord). The map information may include information about an unoccupied or underuse area of the first user. The two-sided matching module 252 may receive a theme for the unoccupied or underused area from the first user. The theme may be a theme for a retail complex to be established on the area preferred by the landlord. For example, a theme may be winter outdoor activities, beach collections, Italian luxury bags, and the like. Then, the two-sided matching module 252 may determine whether a plurality of users required for the theme are registered to the unoccupied area. For example, the two-side matching module determines whether enough retailers related to winter outdoor activities are registered to the area showing interests or plans to place their mobile structures on the area. If it is determined that that the plurality of users required for them are registered to the unoccupied area, the mobile unit control module 254 may instruct the mobile units including mobile structures selected by the plurality of users to move to the unoccupied area.

In embodiments, the two-sided matching module 252 generates map information for a second user (e.g., a retailer). The map information may include information about an unoccupied or underuse area of the first user. The two-sided matching module 252 may receive a shape or a size of a complex structure consisting of the plurality of mobile structures from the second user, identify one or more areas where the complex structure fits based on the shape or size of the complex structure. The identified areas may be indicated on the map such that the second user may view areas available for the complex structure. The two-sided matching module 252 may receive a selection of an area among the identified one or more areas. In response, the mobile unit control module 254 may instruct the mobile units including mobile structures for the complex structure to move to the area.

The mobile unit control module 254, when executed by the one or more processors 242, may transmit instructions to mobile units. The instructions may include moving directions, instructions for delivering mobile structures, instructions for picking up mobile structures, instructions for returning to inventories, and the like.

Still referring to FIG. 2, the first computing device 260 may be communicatively coupled to the mobile unit system 200 and the server 240 via the network 250. The first computing device 260 may be a device for a landlord. The first computing device 260 may include, without limitation, a personal computer, a smartphone, a tablet, a personal media player, or any other electric device that includes communication functionality. A user of the first computing device 260 may understand usage trend of her properties, and information about properties that are available for placing mobile structures. For example, a screen of the first computing device 260 may display a map including properties that are underused and available for placing mobile structures. The user of the first computing device 260 may customize mobile structures to be placed on her property. For example, the user may select a type of a mobile structure to be placed, a maximum number of mobile structures to be placed, a theme of a complex structure, a rental duration, and the like.

Still referring to FIG. 2, the second computing device 270 may be communicatively coupled to the mobile unit system 200 and the server 240 via the network 250. The second computing device 270 may be a device for a retailer. The second computing device 270 may include, without limitation, a personal computer, a smartphone, a tablet, a personal media player, or any other electric device that includes communication functionality. A user of the second computing device 270 may input a type of a structure, a desired location of the structure, a service time and end time for the structure. For example, a screen of the second computing device 270 may display a map and the user of the second computing device 270 may select a location for the structure out of properties that are available for mobile structure placements. The user of the second computing device 270 may view information about co-tenants on an area or areas adjacent to the area, information about locations of facilities on the area (e.g., locations of restrooms, proximity to existing buildings), and the like.

Inventory Crawler

Figure 3:
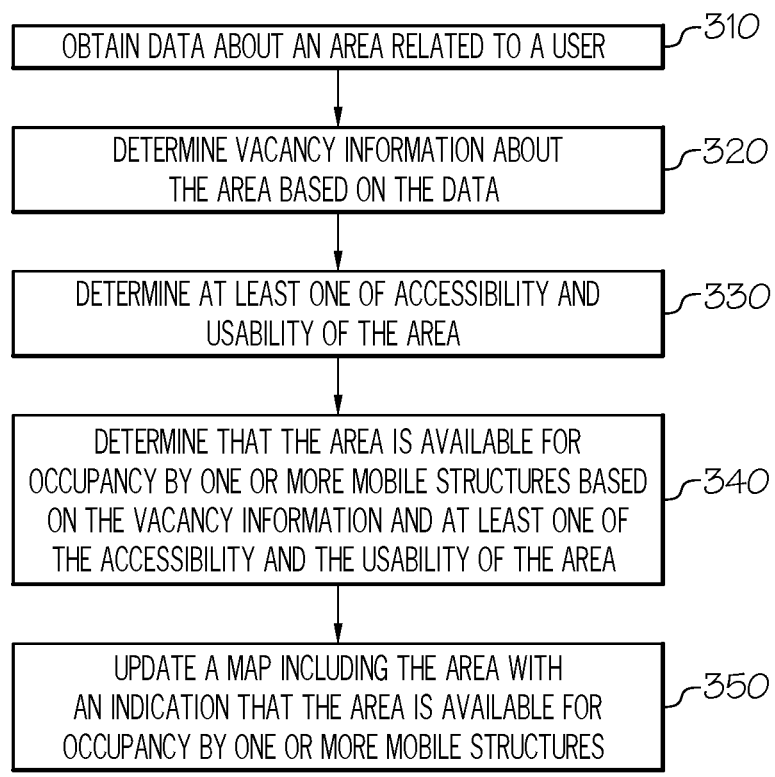
FIG. 3 depicts a flowchart for crawling properties available for mobile structure placements, according to one or more embodiments shown and described herein.

FIG. 3 depicts a flowchart for crawling properties available for mobile structure placements, according to one or more embodiments shown and described herein.

In block 310, the server 102 obtains data about an area related to a user. In embodiments, the inventory crawler module 251 may collect the address of a property of the user and the boundary of the property from local municipal or government database or any other commercial dataset. The inventory crawler module 251 may also collect satellite images of the property. The images can be 2 D or 3D. The user may be a landlord of the property who is interested in making profits by renting out underused portions of the property, and be registered to a platform operated by the server 102. For example, the user may input information about the property including the address of the property. A plurality of users along with their properties may be registered to the platform.

In block 320, the server 102 determines vacancy information about the area based on the data. In embodiments, the inventory crawler module 251 may determine occupied area or unoccupied area of the property based on the satellite images. The inventory crawler module 251 may create an initial inventory of unoccupied properties for short-term renting. In some embodiments, the inventory crawler module 251 may segment the property of the landlord, and monitor whether each segment is occupied or unoccupied. The inventory crawler module 251 may collect timing information about the vacancy of each segment. For example, the inventory crawler module 251 may determine that a first segment is unoccupied for 24 hours a day, a second segment is occupied between 9 am to 3 pm and unoccupied for the rest of the day. Based on the duration of occupancy, the inventory crawler module 251 may prioritize the segments based on occupied time periods of the segments. In some embodiments, the inventory crawler module 251 may determine vacancy information about the area based on geographic information system (GIS) data from databased of government or private entities.

In block 330, the server 102 determines at least one of accessibility and usability of the area. The accessibility may be defined as a degree of accessibility of a mobile unit with respect to the area. In embodiments, the inventory crawler module 251 may determine the accessibility of the area based on various factors including, but not limited to, whether the mobile unit carrying a mobile structure may access the area, information about a road for accessing the area (e.g., a size of the road, a curvature of the road, a loading/unloading space), parking spaces proximate to the area, a shape and/or size of the area, and the like. For example, if a road for accessing a first area is wider than a road for accessing a second area, the first area may have higher accessibility than the second area. If a road for accessing a first area has less curvature or less sharp curves than a road for accessing a second area, the first area may have higher accessibility than the second area. If a first area has a larger loading/unloading space (e.g., a space that allows a mobile unit to load or unload mobile structures) than a second area, the first area may have higher accessibility than the second area. As another example, if there are more parking spaces on or near the first area than a second area, the first area may have higher accessibility than the second area because customers may conveniently park their vehicles and visit mobile structures on the first area than visiting mobile structures on the second area.

The usability of the area may be defined as a degree of utilization of a mobile structure when the mobile structure is placed on the area. The usability of the area may be determined based on various factors including, but not limited to, information about co-tenants on the area or areas adjacent to the area, information about locations of facilities on the area (e.g., locations of restrooms, proximity to existing buildings), and the like. For example, if there is a restroom (e.g., a public restroom or a private restroom in a building of a landlord of the first area) within a certain distance of the first area and there is no restroom within the certain distance of a second area, the first area may have higher usability than the second area. As another example, if a first area has a co-tenant that is popular and draws many customers and a second area has co-tenants that are relatively new and unknown to the public, the first area may have higher usability than the second area. In embodiments, the usability may be defined depending on the characteristics of a potential retailer and characteristics of co-tenants on the area. For example, if a potential retailer is a shoe store, a first area includes co-tenants having business in women's apparel, and a second area includes co-tenants having business in food, then with respect to the potential retailer, the first area may have higher usability than the second area. As another example, the potential retailer may have a list of preferred co-tenants. If the first area includes some of the preferred co-tenants and the second area does not include any of the preferred co-tenants, the first area may have higher usability than the second area for the potential retailer.

In block 340, the server 102 determines that the area is available for occupancy by one or more mobile structures based on the vacancy information and at least one of the accessibility and the usability of the area. In embodiments, the inventory crawler module 251 may determine that the area is available for occupancy by one or more mobile structures if the area is unoccupied for an extended period of time, and the accessibility and/or the usability of the area is greater than a predetermined threshold. In some embodiments, the server 102 may transmit information about the area to an entity, e.g., a local government, in response to determining that the area is available for occupancy by one or more mobile units. Specifically, the server 102 may transmit an application for a short-term renting permit for the area to the local government. The local government may examine the application and transmit a permit to the server 102.

Figure 4:
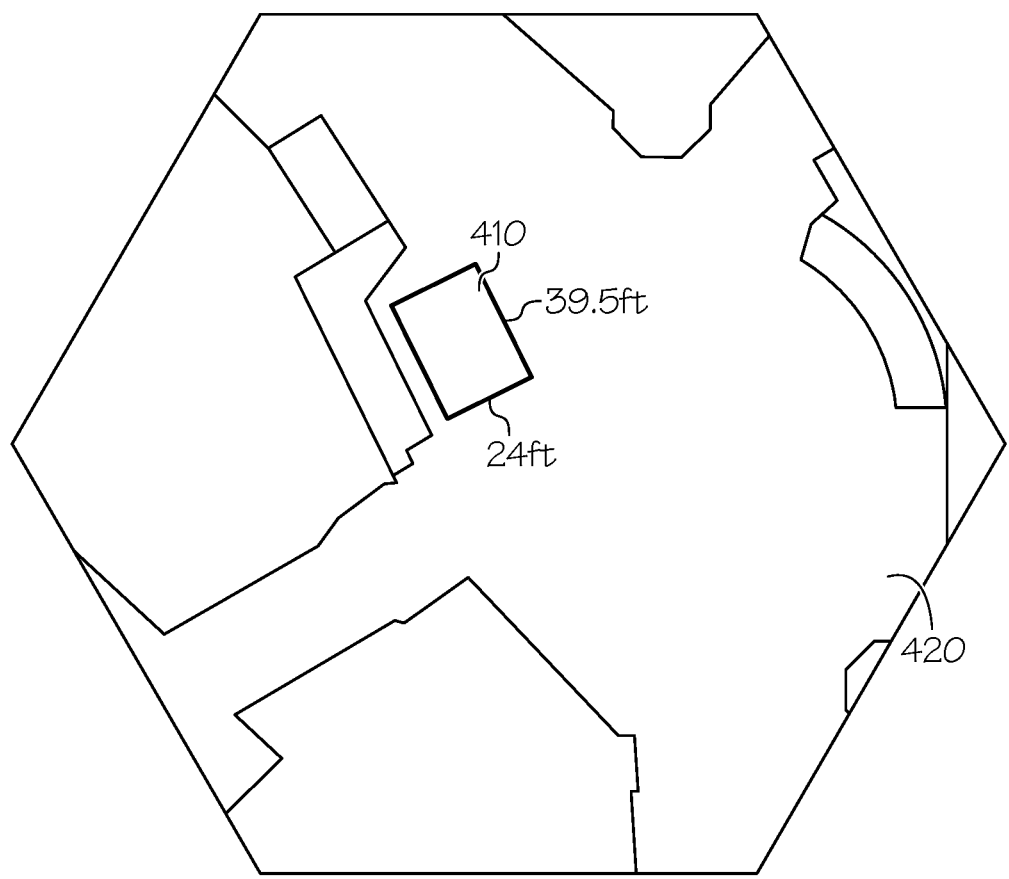
FIG. 4 depict a map including an area available for occupancy by one or more mobile structures, according to one or more embodiments shown and described herein.

In block 350, the server 102 updates a map including the area with an indication that the area is available for occupancy by one or more mobile structures. For example, by referring to FIG. 4, the server 102 may update a map with an indication that the area 410 is available for occupancy by one or more mobile structures. The map may indicate the size of the area 410, for example, 24 feet by 39.5 feet, along with the number of maximum mobile structures that are allowed to be placed on the area 410. In some embodiments, the server 102 may update the map with the indication that the area is available for occupancy by one or more mobile structures after it receives a permit for the area 410 from a local government.

In some embodiments, the server 102 may populate virtual mobile structures (e.g., a virtual 3D or 2D image of a mobile structure) on the area of the map to visualize how the area can be repurposed by a plurality of mobile structures. The virtual mobile structures on the area may be displayed on the screen of the first computing device 260 (e.g., the screen of the smartphone or PC of a landlord) such that the landlord may understand the virtual appearance of the area when mobile structures are placed on the area. Similarly, the virtual mobile structures on the area may be displayed on the screen of the second computing device 270 (e.g., the screen of the smartphone or PC of a retailer) such that the retailer may understand the virtual appearance of the area when mobile structures are placed on the area.

After identifying a plurality of areas that are available for occupancy by one or more mobile structures, the server 102 may rank the areas based on various factors. In embodiments, the server 102 may rank the areas based on various factors including, but not limited to, shopper mobility patterns, co-tenants locations, social media presence, exposure by social influencers, easy access from parking, easy access to other landlords' amenities (e.g., restroom, food court). A rental rate for an area may be determined based on the rankings of the areas. The rankings of the areas may be available to both landlords and retailers through the first and second computing devices 260 and 270, or available to only landlords or only to retailers.

In some embodiments, the server 102 may compute a cost for placing mobile structures on each of the areas that are available for occupancy by one or more mobile structures based on various factors including, but not limited to, insurance costs, labor costs, accessibility, and the like. For example, some areas are exposed to more crimes if they are far away from the center of a mall which results in a higher insurance for property damages against vandalism. Some areas may be relatively difficult for a mobile unit to access when the mobile unit delivers a mobile structure. In this case, additional labor costs may be incurred.

Two-sided Marketplace

Figure 5:
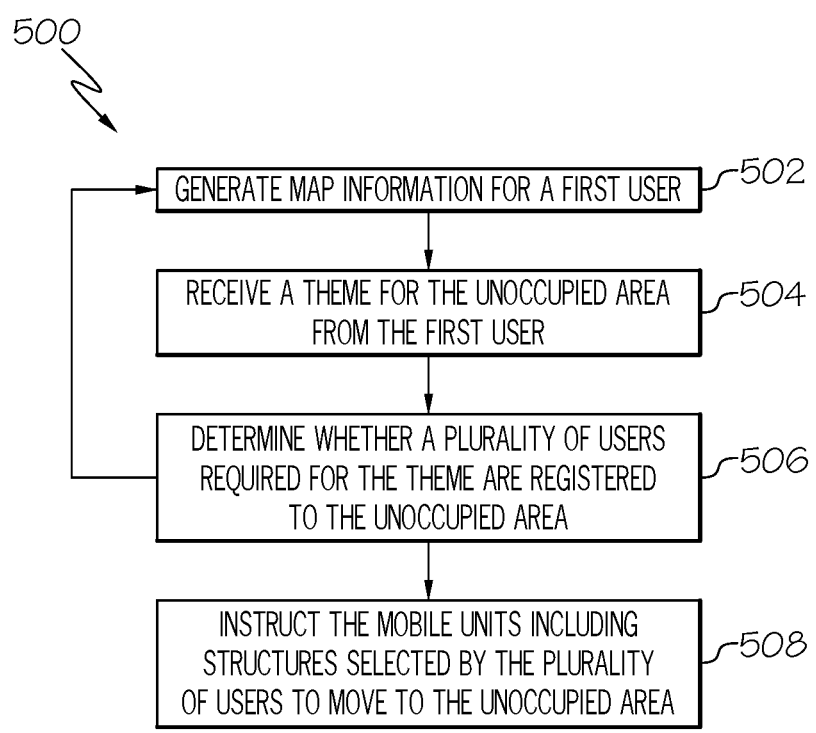
FIG. 5 depicts a flowchart of a process for selecting an area based on a theme, according to one or more embodiments shown and described herein.

FIG. 5 depicts a flowchart of a process 500 for selecting an area based on a theme, according to one or more embodiments shown and described herein. The process 500 is not limited to the steps included in FIG. 5 or to the order of the steps as shown in FIG. 5.

At block 502, map information for a first user may be generated. The first user may be a landlord. The landlord may be the owner of one or more properties. Map information that is generated for the landlord may include a visualization of a geographic area where the landlord's properties are located. Map information that is generated for the landlord may also include a list of the landlord's properties having information about the properties such as, e.g., lot size, current occupants, amenities, and accessibility features. Map information that is generated for the landlord may further include information about an unoccupied area of the landlord, particularly vacancies on the landlord's properties. Map information will be discussed in more detail in the discussions of FIG. 6A and FIG. 6B, below.

At block 504, a theme for the unoccupied area may be received from the landlord. A theme may include a type of service, a type of product, a type of product sourcing, profit potential, customer traffic potential, and other attributes relating to a business. For example, the landlord may select a theme of "eco-friendly winter season apparel" where "apparel" may indicate a type of product being sold; "winter season" may indicate profit potential, depending on the season; and "eco-friendly" may indicate that products are generated from environmentally sustainable supply chains.

At block 506, the system may determine whether a plurality of users required for the theme are registered to the unoccupied area. The unoccupied area may refer to properties owned by the landlord having vacancies as identified in block 502. Users of the system may refer to business owners interested in renting a property from the landlord. Users may register themselves or become registered based on their interest in a property. A user registration may include the theme of the business that the user intends to run on a property.

For example, once the system receives the theme from the landlord, an interface may present a list of retailers who showed interest in a property, based on their registration to the property. The landlord may then advertise the theme and/or solicit interest from the retailers to operate on the property based on the theme. When a retailer confirms interest in the property, the landlord may receive a notification of the confirmation and see the business the retailer intends to operate on the property.

If the system determines that there are no users registered for the theme, the process returns to block 502. If the system determines that there is a plurality of users required for the theme that are registered to the unoccupied area, the system may allow the users to rent the property and the process proceeds to block 508.

At block 508, the system may instruct the mobile units, including structures selected by the plurality of users, to move to the unoccupied area. A mobile structure (or "structure") may include a frame and a liner. A mobile unit (or "unit") may include a chassis, frame, and a liner. A chassis may have wheels for moving itself (e.g., a flatbed trailer may be considered a chassis for a mobile unit) and its payload. Mobile units may comprise multiple mobile units. Similarly, mobile structures may comprise multiple mobile structures.

A user may select one or more mobile units or mobile structures to be placed in the unoccupied area. If the unoccupied area already contains mobile units or mobile structures, the system may only instruct the number of mobile units necessary to match the user selection of mobile units or mobile structures. User selection of mobile units or mobile structures will be discussed in more detail in the discussion of FIG. 8, below.

Figure 6A:
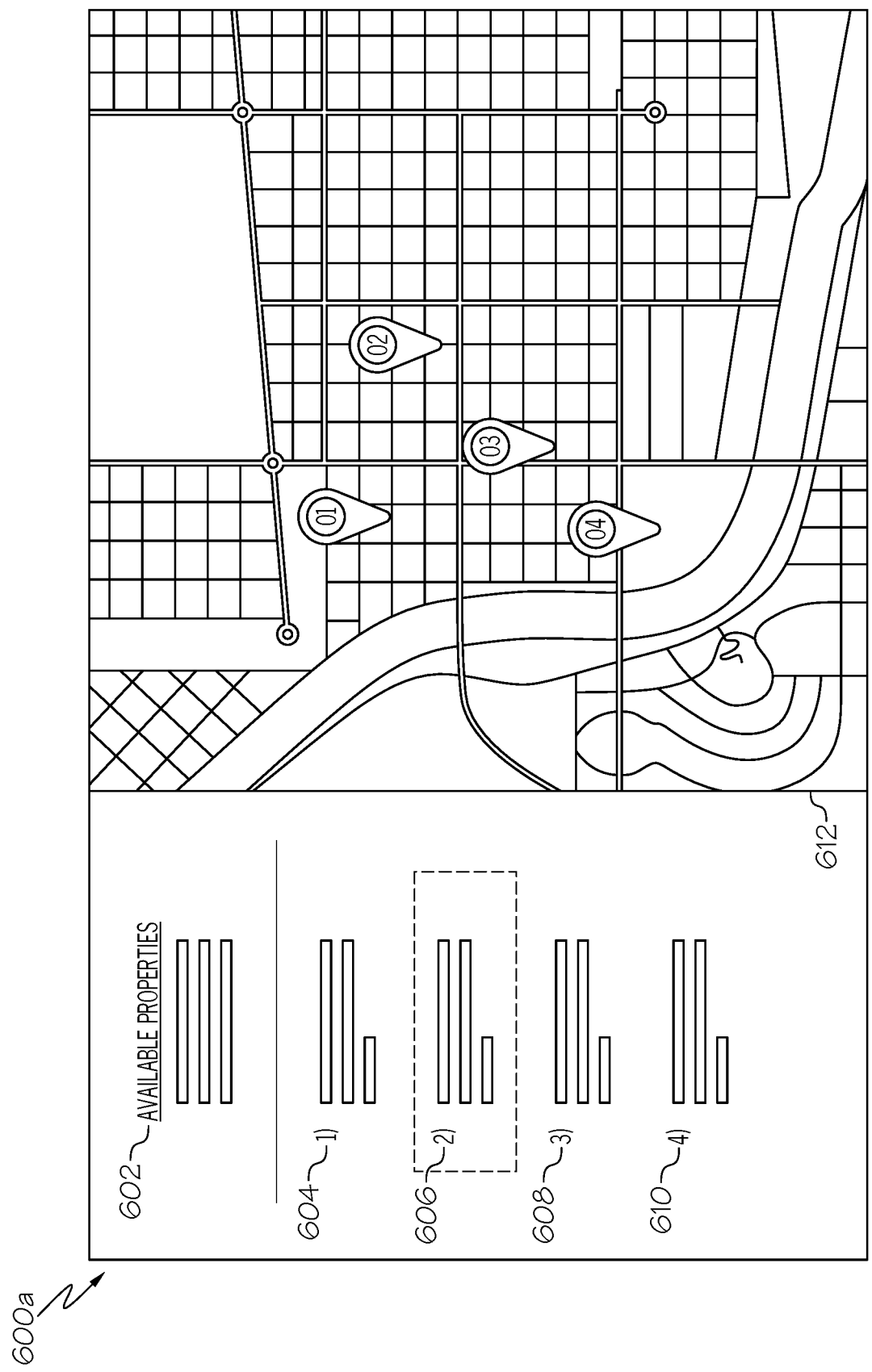
FIG. 6A depicts a GUI for a landlord showing a map with a set of available properties that may be rented out, according to one or more embodiments shown and described herein.

FIG. 6A depicts a GUI 600a for a landlord showing a map 612 with a set of available properties 620 that may be rented out. Discussion of FIG. 6A will be made in reference to FIG. 2 and FIG. 5. The GUI 600a may be populated with information from the server 240. The GUI 600a may be presented to the landlord on a screen of a first computing device 260. The landlord may interact with GUI 600a to generate instructions to be carried out by the server 240.

The GUI 600a may serve as a management page for the landlord's properties. Accordingly, the GUI 600a may include a list of the landlord's properties, particularly a list of one or more available properties 602, where availability refers to a level of occupancy. For example, the list of available properties 602 includes properties 604, 606, 608, and 610. The list of available properties 602 may include information such as the number of available properties, the time the properties have been available, and other metrics of the total available properties. Properties 604, 606, 608, and 610 may be displayed in a list, table, or other organizational formats. Properties 604, 606, 608, and 610 may include an identifier (e.g., 1, 2, 3, and 4) and a description of the property as well as the property's name, location, rental rate, and other property information. In embodiments, the GUI 600a may display the landlord's unavailable properties to modify their information, such as their availability. The property information may include usability and accessibility of the property discussed above.

The available properties 602 may be shown on a map 612, generated as map information in block 502. The available properties on map 612 may be shown as indicators having an identifier corresponding to the identifier in the list of available properties 602. The map 612 may be dynamic and adjustable. For example, when the landlord adjusts the zoom to show a larger geographical area, the map 612 may display more available properties, if there are any.

Figure 6B:
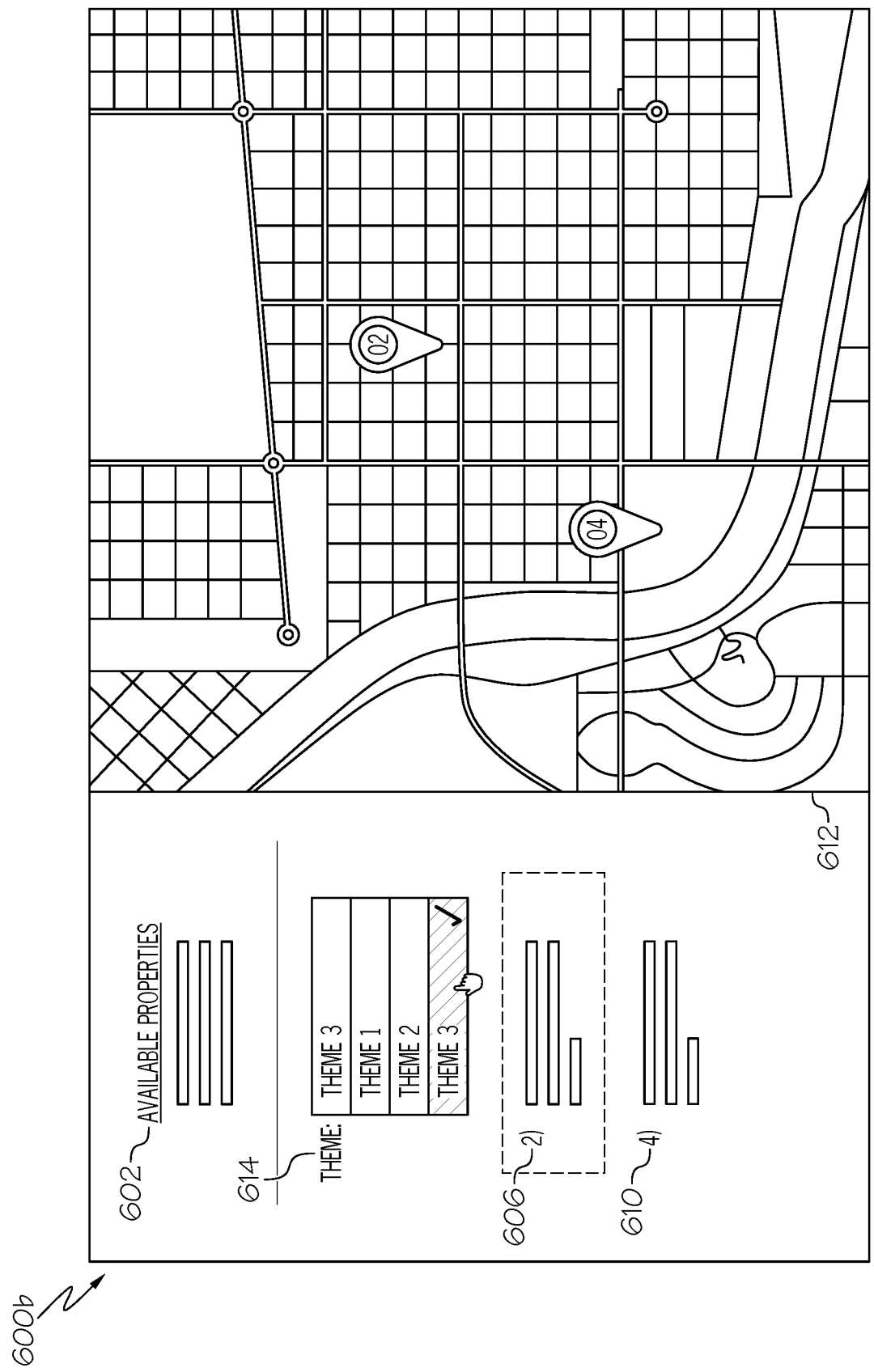
FIG. 6B depicts a GUI for a landlord showing a map with a set of available properties having a theme, according to one or more embodiments shown and described herein.

FIG. 6B depicts a GUI 600b for a landlord showing a map 612 with a set of available properties 602 having a theme. Discussion of FIG. 6B will be made in reference to FIG. 2 and FIG. 5. The GUI 600b is similar in features and functions to the GUI 600a but has the addition of a theme selector 614. The theme selector 614 may be one or more of a dropdown menu, radio button, check box, or other input interfaces. For example, the theme selector 614 in GUI 600b is a dropdown menu that shows three themes with the third theme as the current selection. The selection of the third theme has narrowed down the original four available properties 604, 606, 608, and 610 as shown in GUI 600a to available properties 606 and 610.

In some embodiments, GUI 600b may have an option to list a new available property. The listing process may have a form and/or an editing tool for landlords to graphically list a new property. A form may prompt the landlord for information about the property as well as requirements and constraints of the property. For example, the property may only have structures of a limited height due to city ordinances. An editing tool may allow the landlord to select and/or draw areas on a map of new available properties.

Selecting a theme from the theme selector 614 may generate instructions for first computing device 260 to send the selected theme to server 240. Once the server 240 receives the theme for the available properties of the landlord, the server 240 may determine whether a plurality of users required for the theme are registered to the available property. The server 240 may respond to the first computing device 260 with the plurality of users. The GUI 600b may present the plurality of users to the landlord in the list of available properties 602 and/or under properties 606, 610 corresponding to the users' registrations.

FIG. 7A depicts a GUI 700a for a retailer showing a map 712 with a set of properties available for rent 702 that may be rented by the retailer. Discussion of FIG. 7A will be made in reference to FIG. 2. The GUI 700*a* may be directed to a retailer or any other user seeking rental property. In other words, the GUI 700*a* is directed to a lessee whereas the GUI 600*a* is directed to a lessor. The GUI 700*a* may be populated with information from the server 240 including information about the set of properties available for rent 702. The GUI 700*a* may be presented to the retailer on a screen of the second computing device 270. The retailer may interact with GUI 700*a* to generate instructions to be carried out by the server 240.

The GUI 700*a* may serve as a searching and/or ordering page for the retailer. Accordingly, the GUI 700*a* may include a list of properties available for rent 702, which may include one or more properties from one or more landlords. For example, the list of properties available for rent 702 includes properties 704, 706, 708, and 710. The list of properties available for rent 702 may include information such as the number of properties available for rent, the number of properties in the area, and other metrics of the total properties available for rent. Properties 704, 706, 708, and 710 may be displayed in a list, a table, or other organizational formats. Properties 704, 706, 708, and 710 may include an identifier (e.g., 1, 2, 3, and 4) and a description of the property as well as the property's name, location, rental rate, and other property information. Properties 704, 706, 708, and 710 may display information corresponding to each property including demographic information about the foot traffic in the area, popularity of the area, co-tenants, landlord-provided amenities, pricing, time of or until availability, theme, and other property information. The information may include locations of restrooms, electricity outlets, information about safety camera coverages, parking availability, and the like. The information may further include exposure of the area by social influencers, and any other social media (e.g., Yelp®, Trip Advisor®, Facebook®, Twitter®, etc.) exposure.

The properties available for rent 702 may be shown on a map 712. The available properties on the map 712 may be shown as indicators having an identifier corresponding to the identifier in the list of available properties available for rent 702. The map 712 may be dynamic and adjustable. For example, when the retailer adjusts the zoom to show a larger geographical area, the map 712 may display more properties available for rent, if there are any.

Figure 7B:
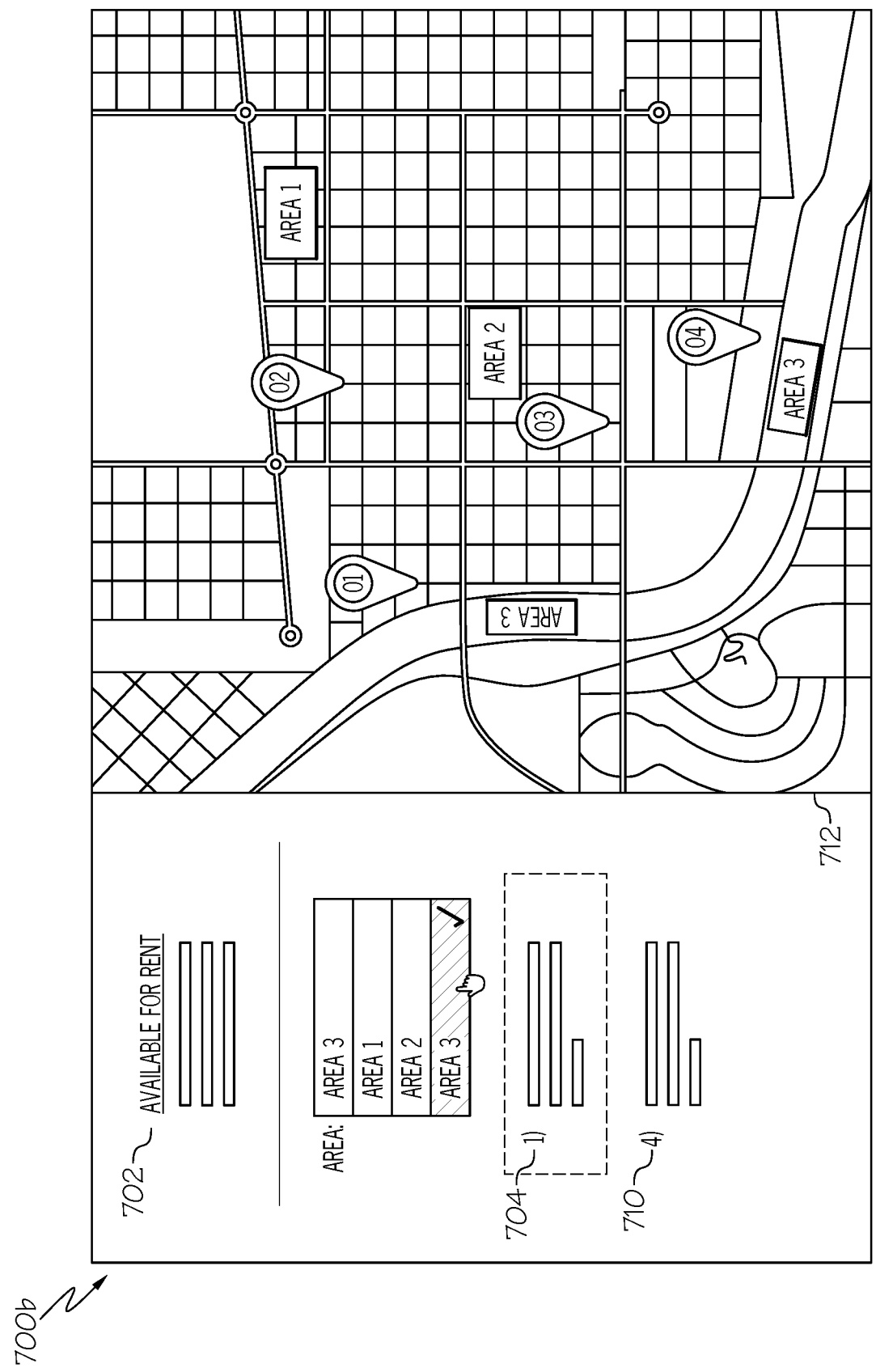
FIG. 7B depicts a GUI for a retailer showing a map with a set of properties available for rent having a set of attributes, according to one or more embodiments shown and described herein.

FIG. 7B depicts a GUI 700*b* for a retailer showing a map with a set of properties available for rent 702 having a set of attributes. Discussion of FIG. 7A will be made in reference to FIG. 2. The GUI 700*b* is similar in features and functions to the GUI 700*a* but has the addition of a filter 714. The GUI 700*b* may have one or more filters 714, each filter 714 relating to an attribute of a property such as, e.g., rental costs, foot traffic, types of co-tenants, and layout. The filter 714 may be one or more of a dropdown menu, radio button, check box, or other input interfaces. For example, the map 712 shows three areas: a park area (area 1), a downtown area (area 2), and a riverbanks area (area 3). The filter 714 narrows the set of properties available for rent 702 by area, in this case the riverbanks area. Because the riverbanks area is selected, the list of properties available for rent 702 is narrowed to properties 704, 710, as they are located next to the river.

Once the retailer has narrowed down the list of properties available for rent 702 to the particular properties the retailer is looking for, the retailer may select a property to initiate a registration process for that property. The registration process may include submitting information such as, e.g., a theme of a business that the retailer intends to run on a property, an offer for a rental price, an anticipated rental duration, and a business rating of the retailer's existing business. GUI 700*b* may generate instructions for the second computing device 270 to send the registration information to the server 240. Once the server 240 receives the registration information, the server 240 may associate the registration with the corresponding property for subsequent retrieval when the landlord is attempting to find tenants. The server 240 may respond to the second computing device 270 with a confirmation to present to the user via GUI 700*b* and/or proceed to further information gathering that may not have been covered by the registration process, such as configuring the layout of the structure to be built.

Figure 8:
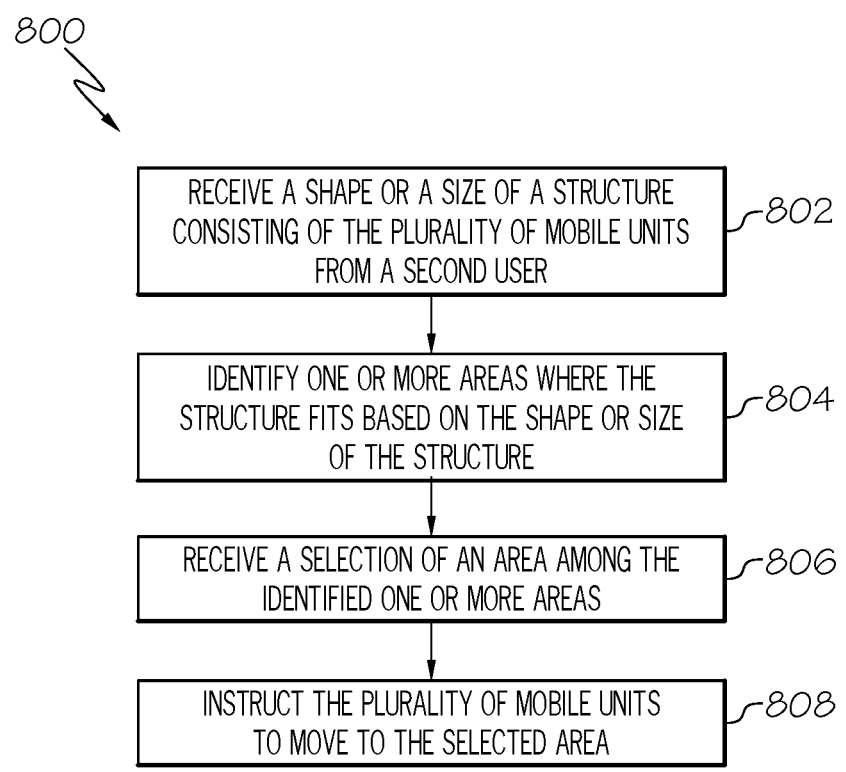
FIG. 8 depicts a flowchart of a process for selecting an area to build a structure, according to one or more embodiments shown and described herein.

FIG. 8 depicts a flowchart of a process 800 for selecting an area to build a structure. A structure refers to a mobile structure and/or mobile unit that may be comprised of multiple mobile structures and/or mobile units. The process 800 is not limited to the steps included in FIG. 8 or to the order of the steps as shown in FIG. 8. The discussion of process 800 is made with references to FIG. 2.

At block 802, a shape or a size of a structure may be received from a second user. The shape or the size of the structure may consist of a plurality of structures. The second user may be a retailer, advertiser, or any other user intending to build a structure. The server 240 of the system may receive the shape or the size of the structure as provided by the second user from the second computing device 270.

At block 804, one or more areas where the structure fits may be identified. The one or more areas may be an area owned by a first user (e.g., a landlord). The one or more areas may also be areas that are available for rent by the second user. The fitness of a structure may be based on the shape or the size of the structure. For example, if the received shape of the structure is an H-shape and the shape of the area is a rectangle, the system may consider the structure to fit in the area because an H-shape may fit into a rectangle. As another example, if the received size of the structure is 1500 square feet and the size of the area is 1600 square feet, the system may consider the structure to fit in the area because 1500 square feet is less than 1600 square feet.

The processor 242 of the server 240 may compare the received shape or size of the structure against the shape or size of a list of areas to identify which areas the structure would fit. The list of areas may include areas of the first user. The server 240 may transmit the identified areas to the second user. The second user may receive identified areas on the second computing device 270.

At block 806, a selection of an area among the identified one or more areas is received. The second user may select the area by clicking or otherwise marking the area for selection on the second computing device 270. The second computing device 270 may transmit and the server 240 may receive the selected area. Once the server 240 has received the selected area, the server 240 may also process the selected area with one or more modules stored in the memory modules 246, such as the inventory crawler module 251, the two-sided matching module 252, and the mobile unit control module 254.

At block 808, the plurality of mobile units may be instructed to move to the selected area. The mobile units may move to the selected area according to a route generated by the mobile unit control module 254. The mobile units may autonomously drive to the selected area because mobile units have wheels, whereas mobile structures do not. Additionally or alternatively, the mobile structures/units may be manually driven (e.g., the structure may be delivered on a flatbed truck). The mobile structures/units may move to the selected area according to a schedule generated by the mobile unit control module 254.

Figure 9:
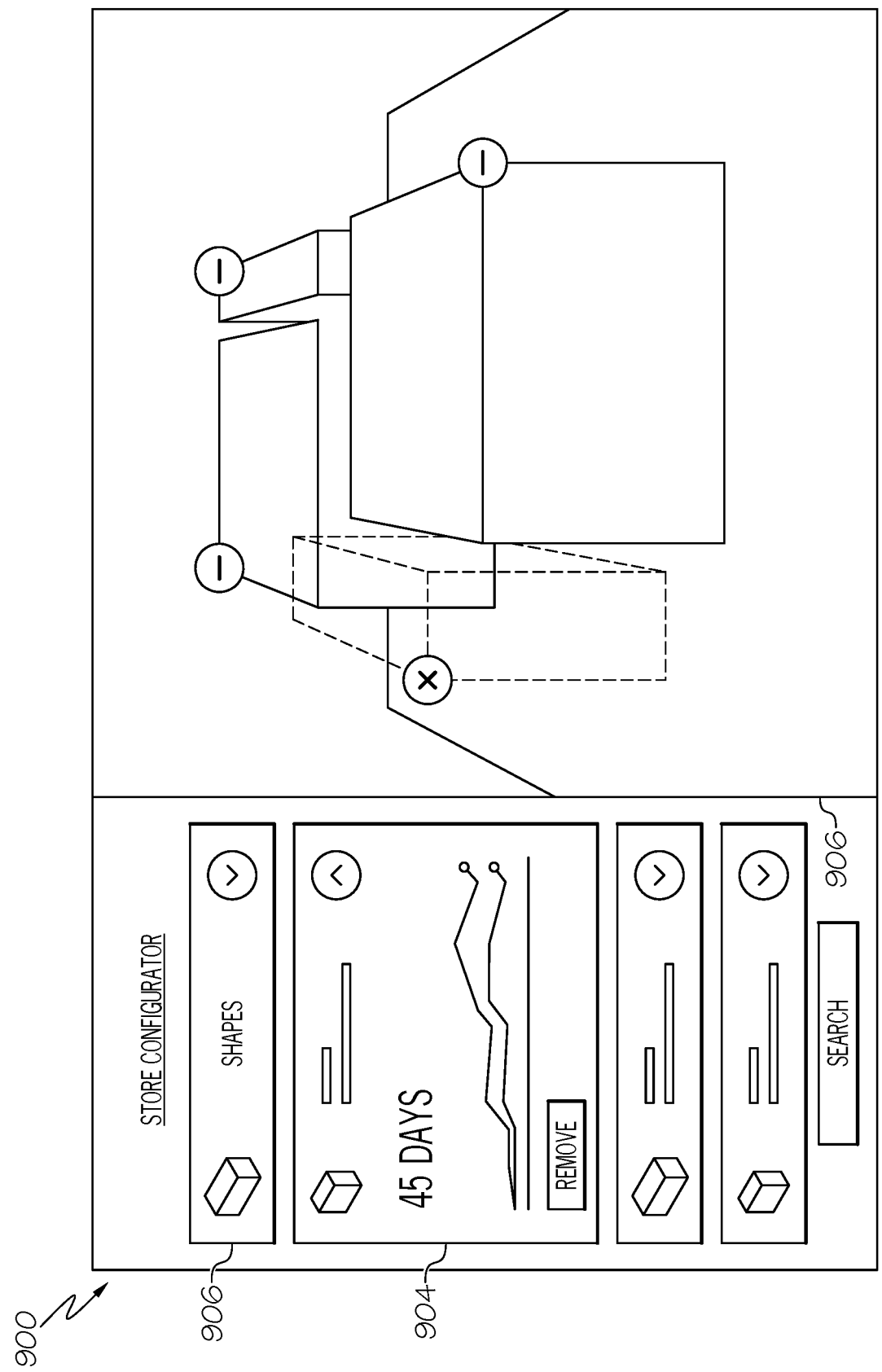
FIG. 9 depicts a configuration GUI for configuring a structure, according to one or more embodiments shown and described herein.

FIG. 9 depicts a configuration GUI 900 for configuring a structure. A structure refers to a mobile structure and/or mobile unit that may be comprised of multiple mobile structures and/or mobile units. Discussion of FIG. 9 may be made with reference to FIG. 2 and FIG. 8. The configuration GUI 900 may include a list of configuration options for a structure such as a shapes configurator 902, a rental period configurator 904, and design configurator 906.

A user, such as a retailer, may drag one or more structure shapes from the shapes configurator 902 and drop the one or more shapes onto the design configurator 906. Within the design configurator 906, the user may arrange the one or more shapes of structure to configure a larger overall shape of the combined mobile units. For example, a user may configure a structure to be in an H-shape by dragging two elongated mobile structures/units from the shapes configurator 902 onto the design configurator 906 and aligning the two elongated mobile structures/units so they are in parallel, as well as dragging a square structure from the shapes configurator 902 onto the design configurator 906 between the two elongated mobile structures/units. The design configurator 906 may also include options to remove shapes.

Once the user has completed the configuration, the user via the second computing device 270 may send and the server 240 may receive the configured structure. After the second computing device 270 sends the configured structure, the server 240 may engage in blocks 802, 804 of the process 800.

Once the server 240 has identified areas that the structure would fit, the server 240 may send the identified areas to the second computing device 270 to show to the user via GUI 900. The GUI 900 may show a map and/or a list of the identified areas that may accommodate the structure configured. Although not depicted in FIG. 9, the map of GUI 900 may be similar in appearance and function to maps 612, 712. The user may interact with GUI 900 to select an identified area to build the structure.

Inserted Liner

Figure 10:
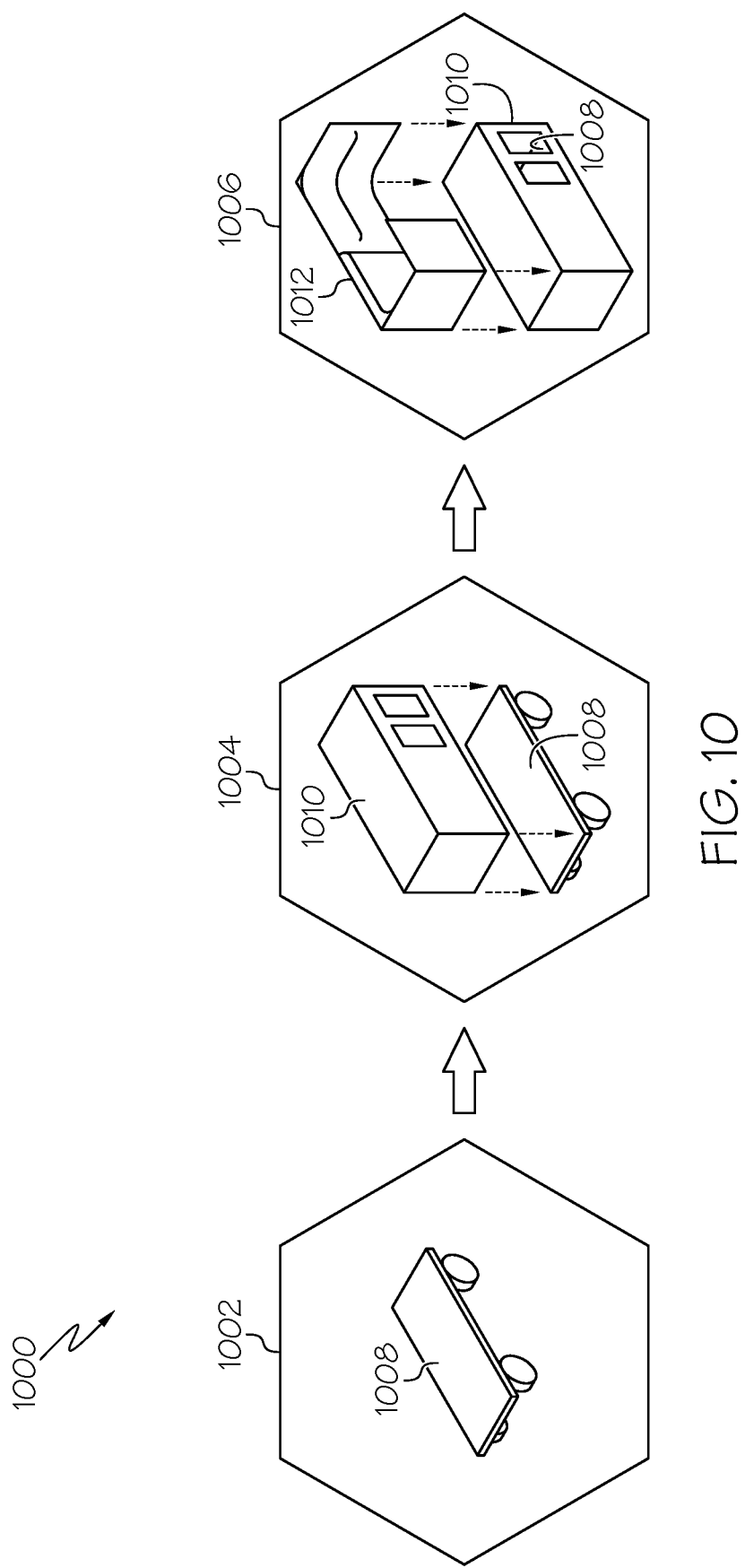
FIG. 10 depicts a process for assembling a unit of modular units, according to one or more embodiments shown and described herein.

FIG. 10 depicts a process 1000 for assembling a unit of modular units 1008, 1010, 1012. The unit may comprise a chassis 1008, an upper cabin external frame 1010, and an upper body cabin interior liner 1012. The upper cabin external frame 1010 and the upper body cabin interior liner 1012 in combination may constitute the mobile structure, e.g., the mobile structures 120, 122, 124. In some embodiments, the chassis 1008, the upper cabin external frame 1010, and the upper body cabin interior liner 1012 as a whole constitute the mobile structure. The process 1000 is intended to be demonstrative and not limiting.

The unit assembly process 1000 may begin at a first stage 1002 with a chassis 1008. The chassis 1008 may have wheels to allow it to be towed, pushed, driven, instructed to drive, or otherwise moved. For example, the chassis 1008 may be a flatbed trailer capable of carrying modular units for a structure. In some embodiments, the wheels of the chassis 1008 may be removable to convert the chassis 1008 into a floor for the structure and/or to reduce the height of the structure. For example, if a structure was to be built on an unimproved surface, the chassis 1008 may have its wheels removed for the chassis 1008 to be the improved surface on which the structure stands.

In embodiments, a chassis 1008 can deliver one or more modular units at a predetermined location. After delivering and unloading the one or more modular units at a predetermined location, the chassis 1008 can deliver other modular units to keep the supply of modular units flowing. The module units that the chassis 1008 delivers at any given moment do not have to go to the same destination. For example, the chassis 1008 may be carrying an exterior frame and two liners, where the exterior frame and one liner may be going to a first destination and the remaining liner may be going to the second destination.

The structure assembly may continue to a second stage 1004 where an upper cabin external frame 1010 is applied. The external frame 1010 provides support for the structure. The external frame 1010 may have cutouts for ingress and egress of the external frame 1010 and/or another external frame. External frames 1010 may contain connection for modular connectivity so that multiple external frames 1010 may be connected to create a larger structure. Additionally, the external frame 1010 may be hollow to allow for the insertion of an interior liner 1012.

The details of the larger structure and the external frames 1010 that make up the structure may be selected by a user. For example, the user may select the shape of the structure and its corresponding external frames 1010 via a configuration GUI 900, discussed above. The details of the structure may also be dependent on the property that it is to be installed on. For example, the structure may only need the external frame 1010 and the interior liner 1012 but not the chassis due to the surface that the structure is to be installed on.

The structure assembly may continue to a third stage 1006 where an interior liner 1012 is inserted into the external frame 1010. An interior liner 1012 may be designed to fit squarely within an external frame 1010. An interior liner 1012 may also be designed to fit within multiple external frames 1010. An interior liner 1012 may further be designed to fit multiple interior liners 1012 within a single external frame 1010.

The size of the interior liner 1012 may vary based on the size of the external frame 1010. Users, such as retailers seeking to build a structure, may choose from different types of interior liners 1012 for their structure. In some embodiments, the available types of interior liners 1012 may be based on the size of the external frame 1010 located at the property. For example, if the size of the external frame 1010 currently located at the property is 24 feet by 8 feet, only the interior liners 1012 that may fit into the external frame 1010 of 24 feet by 8 feet may be displayed as available options.

In embodiments, after a user finishes using a structure, the external frame 1010 may remain on the property while the interior liner 1012 may be removed to be reused, stored, or replaced. This may help reduce costs because moving the external frame 1010 may be the most expensive part of the process 1000. For example, if there is an incoming request from a retailer to discontinue the monthly subscription for the structure, then the external frame 1010 may remain on the property so that a new retailer moving onto the property can re-use it or so that it may not have to be moved as far for its next destination.

Figure 11:
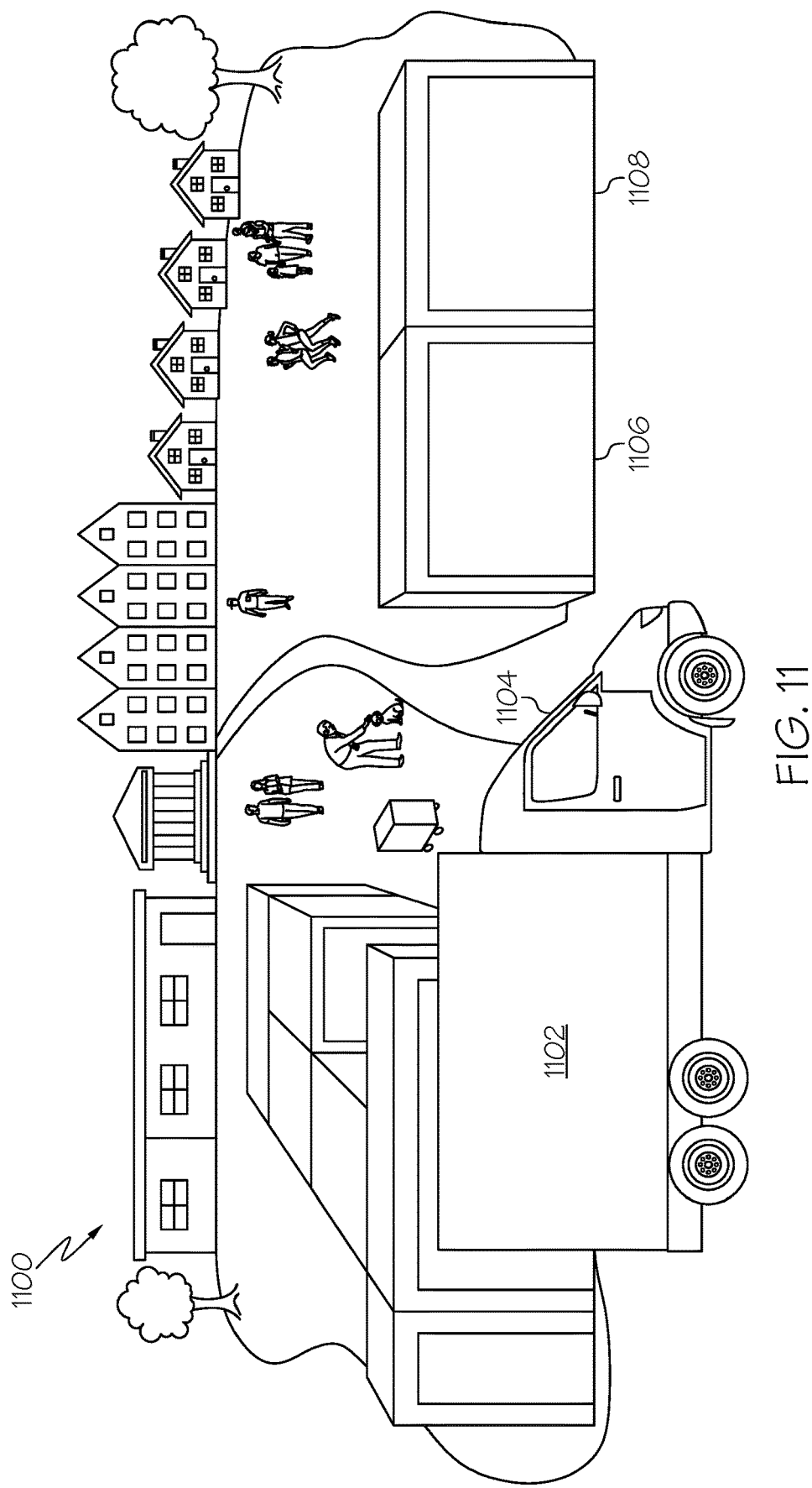
FIG. 11 depicts a mobile unit delivering an interior liner to a property having an upper cabin, according to one or more embodiments show and described herein.

FIG. 11 depicts a mobile unit 1104 delivering an interior liner to a property 1100 having an upper cabin 1102. Discussion of FIG. 11 may be made with references to FIG. 10. A mobile structure may include an external frame 1010 and an interior liner 1012. A mobile unit 1104 may include a chassis 1008, an external frame 1010, and an interior liner 1012. In other words, the mobile unit 1104 may be a structure and a chassis 1008. The structure may be the upper cabin, including an external frame 1010 and an interior liner 1012.

In FIG. 11, the property 1100 has a structure comprising of a primary structure 1106 and a secondary structure 1108. Because of the interchangeability of the modular units of the present disclosure, several scenarios could be taking place in FIG. 11. It should be understood that the following scenarios are exemplary and not intended to be limiting.

In one scenario, a retailer may have built a structure 1106 to operate a business. The retailer's business may have needed to increase inventory due to increased demand, so the retailer ordered the secondary structure 1108 to connect to the structure 1106. Suppose now that the retailer ordered yet another structure, a tertiary structure (i.e., upper cabin 1102) to add more operating space. The retailer may have ordered another structure on a web interface to be delivered by a mobile unit 1104. The mobile unit 1104, in this case, is a truck having upper cabin components 1102 (i.e., an external frame 1010 and an interior liner 1012) as ordered by the user. After the upper cabin components 1102 are delivered, the mobile unit 1104 (also referred to as the chassis 1008) can keep moving around to deliver other components to other properties.

In another scenario, a past tenant may have just moved out and the new tenant retailer is moving in the property 1100. After the past tenant moved out, the structures 1106, 1108 (i.e., the exterior frames and interior liners) may remain on the property 1100, the exterior frames of structures 1106, 1108 may remain on the property 1100, or no parts of the structures 1106, 1108 may remain on the property 1100. In FIG. 11, at least the exterior frames remain on the property 1100. The exterior frames remaining on the property when a new tenant is moving in may be indicative of the new tenant's structure including at least the exterior frames from the previous structure.

In yet another scenario, a past tenant may have just moved out and the new tenant retailer is moving in the property 1100 with the same structure but a different layout and/or interior. To change the layout, the exterior frames may simply need to be rearranged. To change the interior, the retailer may order new interior liners to replace the previous interior liners. The mobile unit 1104 may arrive with the requested interior liners for the retailer. The mobile unit 1104 may also remove the old interior liners to deliver to a storage area or one or more other properties requesting liners of this type. A storage area may include a bulk storage area for interior liners or it may include other unoccupied structures on or near properties that will likely use the interior liners to reduce moving time in the future.

In some embodiments, the system may include a prediction element for planning the delivery of chassis, exterior frames, and interior liners. When mobile units 1104 are moving items to and from properties, such as property 1100, the system may collect information such as, e.g., incoming and outgoing traffic, the average staying time of each customer in the structure, and interaction with digital signage and near field communication (NFC) devices. Building up traffic and usage data may allow the system to predict what properties will likely need more of certain types of exterior frames and interior liners. Based on the predictions, the system may instruct mobile units 1104 to deliver items to centralized storage areas or vacant properties that are nearby where the items will likely be used next in order to reduce moving time in the future.

Seamless Retail Entertainment

Figure 12A:
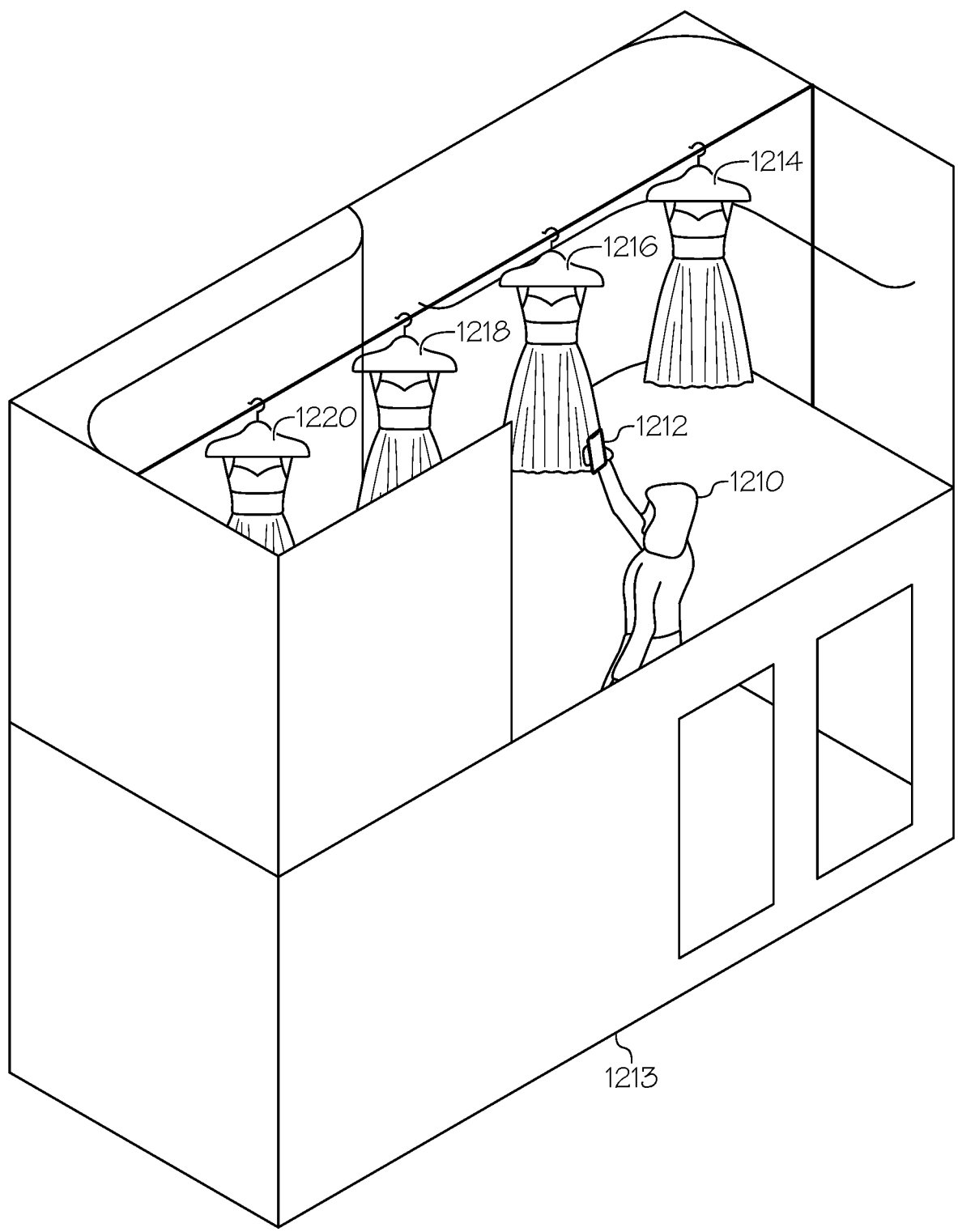
FIG. 12A schematically depicts an example interaction of an example customer with the mobile structure of the present disclosure, according to one or more embodiments shown and described herein.

FIG. 12A schematically depicts an example interaction of an example customer 1210 with the mobile structure of the present disclosure, according to one or more embodiments shown and described herein. As illustrated in FIG. 12A, an example customer 1210, carrying an example mobile device 1212 (e.g., a smartphone), may walk inside the example mobile structure 1213 and browse through various products. As illustrated, such products may include different colored example dresses 1214, 1216, 1218, 1220 hanging from a rack positioned in the example mobile structure 1213. In embodiments, electronic chips such as an RFID chip, or a near-field communication (NFC) chip may be affixed or positioned in areas behind shelves or portions of the example mobile structure 1213 within which the example dresses 1214, 1216, 1218, 1220 are located. Additionally, in embodiments, the NFC chip may be detachably affixed or positioned on one or more tags hanging from the example dresses or may be detachably affixed or positioned on one or more portions of each of the dresses.

In embodiments, the example customer 1210 may walk into the example mobile structure 1213, approach the example dress 1216, and contact (e.g., tap) a portion of the example dress 1216 with the example mobile device 1212. In other embodiments, the example customer 1210 may simply bring the example mobile device 1212 within a certain proximity of the dress or within a certain proximity of an NFC chip located adjacent to, behind, or otherwise near the dress. In response, based on the proximity of the example mobile device 1212 to the NFC chip, a software application may be initiated on the example mobile device 1212. Thereafter, an example user interface (e.g., a digital page) may be output on a screen of the example mobile device 1212. Such a digital page may provide information about a particular product—the example dress 1216 in this instance. For example, the information provided on the digital page may include data relating to the designer of the example dress 1216, the total number of the example dress 1216 available for sale, information describing unique features of the dress, the sizes in which the dress may be available, and so forth. The digital page may also display markers or indicators that provide the example customer 1210 with instructions regarding where on the example dress 1216 the example customer 1210 should look. For example, such markers or instructions may inform the example customer 1210 to pay particular attention to a unique pattern, embroidery, or various unique stylistic features associated with the example dress 1216.

In embodiments, the digital page may also include icons corresponding to, e.g., highlights, with which the example customer 1210 may interact. For example, the icons may be labeled "Like", or "Dislike", or "Not Interested", and so forth. Other labels for the icons corresponding to the highlights are also contemplated. In embodiments, these icons may be positioned on various portions of a graphical representation (e.g., images) of the example dress 1216 that may be output on the screen of the example mobile device 1212. For example, a "Like" and a "Dislike" icon (or icons having other labels) may be positioned on the top portion, center portion, bottom portion, the straps, and so forth, of an image of the example dress 1216 output on the screen. In embodiments, the size of the icon corresponding to the highlights may be varied dynamically depending on a number of customers that may have interacted with each icon. For example, the size of a particular icon may be large based on a number of customers indicating that they liked the example dress 1216 (or a unique stylistic part of the dress). Alternatively, the particular icon may be small based on a small number of customers interacting with the icon or a number of customers interacting with the icon and indicating that they did not like the example dress 1216.

In embodiments, the system of the present disclosure may detect and track data relating to the frequency of customer interactions with different aspects of various products and services. For example, the system of the present disclosure will track data relating to the customer's interactions with each product (e.g., each of the dresses 1214, 1216, 1218, 1220), interactions with and selections of different colors, different sizes, different styles, different designers, brands, and so forth, associated with the product. The frequency of interactions with various products and services will indicate the popularity level of these products and services. In embodiments, the collected statistics relating to the frequency of customer interactions may be communicated to a server. The server may analyze the collected statistics and generate a new product inventory to be shipped to a sales associate. In embodiments, the new product inventory will be based on the most popular items (determined based on the frequency of customer interactions) and will replace the existing product inventory at a particular location.

Additionally, icons (corresponding to highlights) that were most often selected or interacted with by customers will be displayed on a digital page output on a mobile device of a new customer, e.g., when the new customer taps or interacts with a particular product. In this way, a whole feedback loop that is based on getting feedback from customers and tracking customer interactions may be utilized to update a digital layer of the system described herein (e.g., content that is displayed on a screen of a customer's smartphone when a user approaches or taps a product), and strategically stock products on the shelves of the example mobile structure 1213 such that the likelihood of selling a product is improved.

Additionally, icons may be labeled "Wish List" or "Favorites", which may be linked to digital folders or digital storage areas into which the example customer 1210 may store information, e.g., information related to the example dress 1216. In embodiments, the example customer 1210 may be able to save one or more details relating to the example dress 1216 (data described above, images of the example dress 1216, and so forth) into a wish list folder or favorites folder by, e.g., selecting the icons labeled "Wish List", "Favorites", and so forth.

Figure 12B:
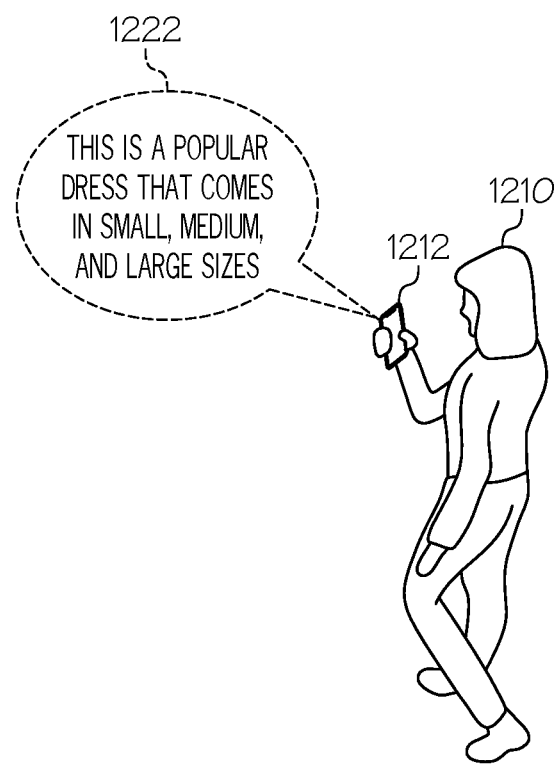
FIG. 12B schematically depicts an example feature resulting from the example customer interacting with the example dress using the example mobile device, according to one or more embodiments shown and described herein.

FIG. 12B schematically depicts an example feature resulting from the example customer 1210 interacting with the example dress 1216 using the example mobile device 1212, according to one or more embodiments shown and described herein. In embodiments, upon the example customer 1210 walking into the mobile structure 1213 and contacting (e.g., tapping) a portion of the example dress 1216 with the example mobile device 1212, a software application accessible on the example mobile device 1212 may be initiated. In embodiments, the software application may be initiated based on receiving a communication from an NFC chip located adjacent to, behind, or otherwise near the dress. Upon initialization, the software application may output a virtual user guide (e.g., a virtual sales associate) on the screen of the example mobile device 1212. The virtual sales associate may appear to output information via the speakers of the mobile device 1212 (e.g., audio information) that relates to the example dress 1216. In embodiments, the audio information may be instructions to look at a design located behind the product, or a description of various functions or features of the product. Other details may also be output. For example, as illustrated in FIG. 12B, the audio information 1222 that is output may be something like "This is a popular dress that comes in small, medium, and large sizes". A variety of other embodiments are also contemplated.

Figure 13A:
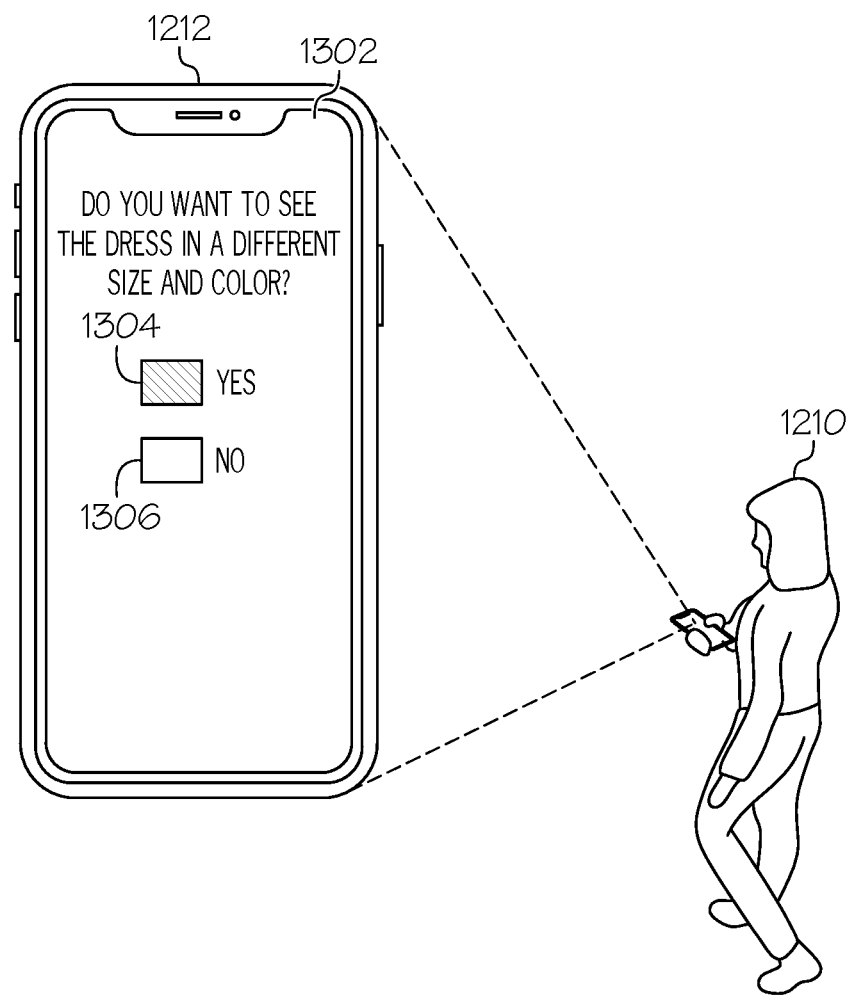
FIG. 13A schematically depicts an example digital page that may be output as part of an interface that appears on the screen of the example mobile device of the example customer, according to one or more embodiments described and illustrated herein.

FIG. 13A schematically depicts an example digital page that may be output as part of an interface that appears on the screen of the example mobile device 1212 of the example customer 1210, according to one or more embodiments described and illustrated herein.

In embodiments, prior to, simultaneously with, or after the audio information 1222 is output via the speakers of the example mobile device 1212, another digital page (e.g., another example user interface) may be output on the screen of the example mobile device 1212. Specifically, as illustrated, a text prompt 1302 may be output on the screen of the example mobile device 1212 inquiring whether the example customer 1210 would like to see the dress in a different size and color. Additionally, user selectable options 1304, 1306 may also be provided. In embodiments, the different size and color may refer to a size and color of the dress that is not included as part of the example dresses 1214, 1216, 1218, and 1220. In response, the example customer 1210 may select the option 1304 ("Yes"). In response to the selection of option 1304, information relating to an example dress of a different size and color may be displayed on a large display device (e.g., a TV signage, HD monitor, and so forth).

Figure 13B:
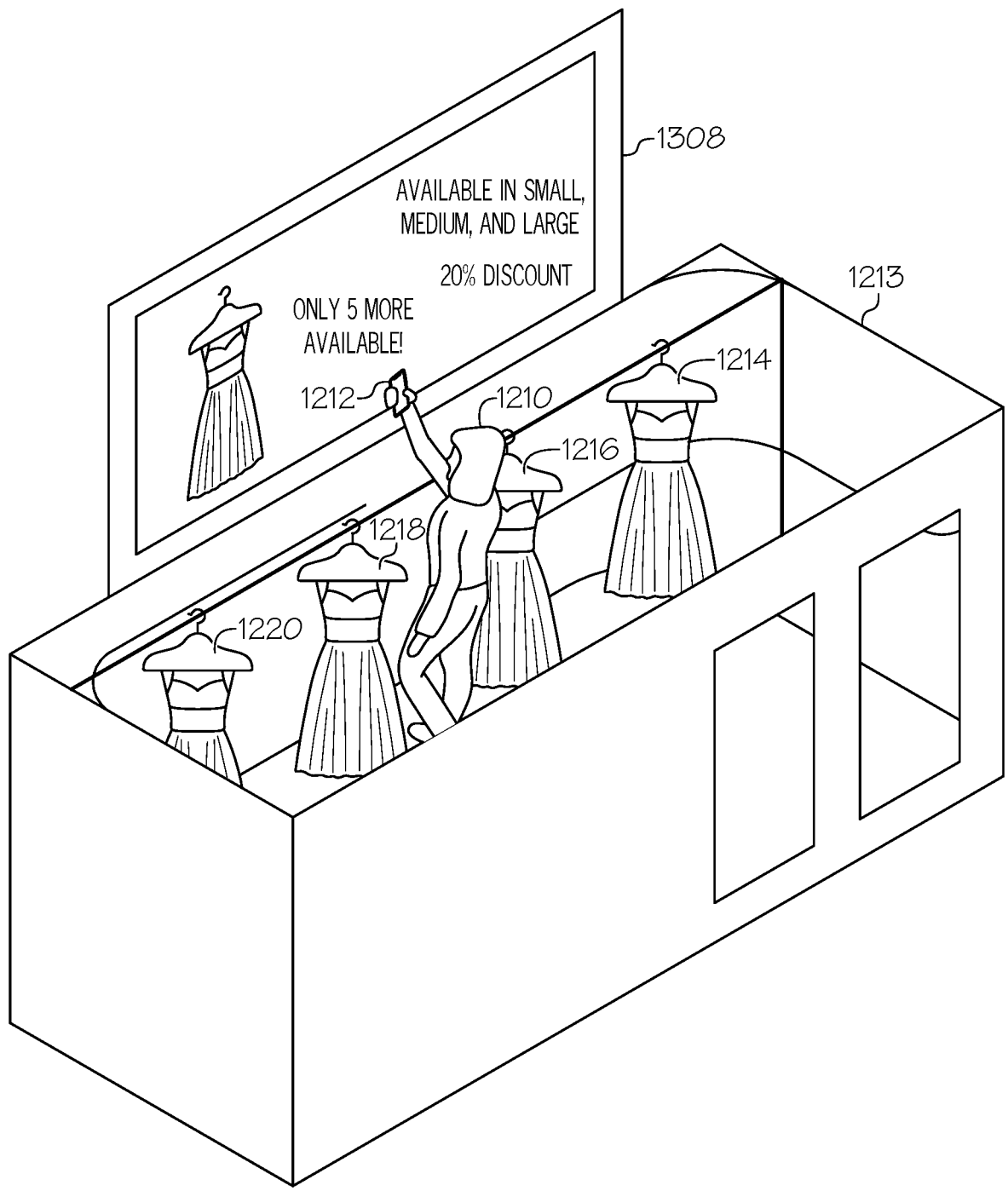
FIG. 13B schematically depicts an example display device positioned adjacent to the example mobile structure and displaying information related to a product, according to one or more embodiments described and illustrated herein.

FIG. 13B schematically depicts an example display device 1308 on the wall of or adjacent to the example mobile structure 1213 and displaying information related to a product, according to one or more embodiments described and illustrated herein.

Specifically, as illustrated in FIG. 13B, the example display device 1308 may output or display data related to a particular example dress that, e.g., may not currently be available in the example mobile structure 1213. The size of the example display device 1308 may be greater than the size The data that is displayed may include the sizes in which the dress is available, the inventory of the dress (e.g., 5 are available), a discount percentage (e.g., 20%), and an image of the dress. It is noted that a plurality of virtual images be displayed on the display device 1308 such that the example customer 1210 may feel as if he or she is interacting with the dress. For example, the virtual images may be three dimensional virtual images, or may include options for the example customer 1210 to change the color, size, other features of the dress, and so forth. In other embodiments, products that are similar to the dress or related to the dress (e.g., dress accessories) may also be output on the example display device 1308.

In embodiments, the example customer 1210 may also interact directly with the display device 1308. For example, the example customer 1210 may bring the example mobile device 1212 within a certain proximity of the example display device 1308, on or adjacent to which an NFC chip may be positioned. The NFC chip may include identification information that is specific to the display device 1308. Upon sensing the example mobile device 1212 within a certain proximity, the NFC chip may communicate with the display device and initialize the example display device 1308. In particular, the NFC chip may turn on the example display device 1308. Thereafter, the display device 1308 may play a standard brand video that relates to one or more products, services, and so forth.

Additionally, in embodiments, the system described herein may also track and analyze other types of customer wait times, namely times that customers spend in line in anticipation of interacting with display devices (e.g., the example display device 1308). For example, the system may determine that there are three customers waiting in line to use the example display device 1308, and track the times that each of the three customers spent waiting in line. Specifically, if each of the three customers spent 5 minutes, 10 minutes, and 10 minutes, respectively, such data may be utilized by the system to determine that the example display device 1308 is part of a high traffic area. As such, the system may recommend that additional mobile structures and/or additional display devices should be included adjacent to or near the example display device 1308, e.g., in order to reduce customer wait times and better manage the foot traffic in the area. In some embodiments, the system may determine whether the wait time is greater than a threshold time, and transmit a request for an additional mobile structure to a server, such as the server 240 in FIG. 2, if the wait time is greater than the threshold time. In some embodiments, the system may determine whether the traffic such as a foot traffic or wait time within the mobile structure 1213 is less than a predetermined threshold, and transmit a request for removing the mobile structure 1213 to the server 240 if the traffic is less than the predetermined threshold.

In contrast, if another example display device fails to experience any customer interactions during a particular time period, or experiences customer interactions that are below a particular threshold interaction level (e.g., one customer per day, one customer every other day, and so forth), the system may determine that the area within a certain proximity of this example display device experiences low traffic. As a result, in embodiments, the system may recommend the removal of the example display device and/or any mobile structures positioned near the example display device. In this way, customer traffic near display devices may be efficiently managed. The system described herein anticipates enabling customers to have a seamless interaction between the products, the software application accessible via their respective mobile devices, and various display devices located adjacent to these products positioned on or within the mobile structures described herein.

In some embodiments, the server 240 receives traffic information from the mobile structure 1213 and decides whether to add more mobile structures or remove the mobile structure based on the traffic information. For example, the server 240 instructs the mobile structure 1213 to move to a location, e.g., the current location of the mobile structure 1213. The server 240 receives, from the mobile structure 1213, traffic within the mobile structure 1213. The server 240 instructs an additional mobile structure to move to the location of the mobile structure 1213 based on the traffic within the mobile structure 1213. Specifically, the server 240 determines whether the traffic is greater than a first threshold, and instructs the additional mobile structure to move to the mobile structure in response to determining that the traffic is greater than the first threshold. The server 240 may instruct the mobile structure 1213 to depart from the location in response to the traffic becoming smaller than a second threshold. In some embodiments, the server 240 determines wait time in line for an interaction with a screen of the mobile structure 1213 based the traffic within the mobile structure 1213, and instruct the additional mobile structure to move to the location of the mobile structure 1213 in response to determining that the wait time is greater than a threshold time.

In some embodiments, the system may collect data for customers' interaction with merchandizing shelves and transmit a request for more products from a warehouse based on the data. The system may also collect information about the customers' choices on a digital catalog on the display device or the customers' smartphones. Based on the customers' choices, the system may change the product lineups displayed on the merchandizing shelves.

The present disclosure is directed to methods and systems for providing flexible retail model in the physical world. A mobile unit, or an agile space, is a new mobility concept that rethinks the use and provisioning of space, both indoors and outdoors, with multiple usage applications. The present disclosure is to bring great experiences to people by providing customized, efficiently packaged spaces created to address societal challenges. The mobile unit may be a portable retail showroom and promote retailers' brands and products in different venues without the need of long-term commercial lease contracts.

The present disclosure provides the creation of a two-way marketplace, one in which retailers can promote their products and brands in new environments while landlords can leverage and monetize space that is underutilized, i.e., a win-win situation for both retailers and landlords. The present methods and systems help make the retail ecosystem more dynamically responsive to consumer needs. With a more agile retail space, retailers can more freely enter a broader array of venues and test out locations without committing to them long-term. Landlords can experiment with a greater variety of brand and service options to draw foot traffic, which is often a challenge in traditional brick-and-mortar retail environments. Consumers benefit from being served the best possible retail experience.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A system comprising:
one or more mobile units;
one or more mobile structures; and
a controller configured to perform operations comprising:
obtaining data about an area related to a user;
determining vacancy information about the area based on the data, the vacancy information relating to unoccupied or underused areas for a predetermined period of time;
determining at least one of an accessibility and a usability of the area;
determining that the area is available for occupancy by the one or more mobile structures based on the vacancy information and at least one of the accessibility and the usability of the area; and
updating a map including the area with an indication that the area is available for occupancy by the one or more mobile structures, wherein the controller is configured to perform operations further comprising:

receiving a selection of the area and a selection of a replaceable liner among a plurality of different replaceable liners; and controlling a first mobile unit, from the one or more mobile units, to autonomously navigate and carry a first mobile structure, from the one or more mobile structures, that includes the replaceable liner to the area without human input in response to receiving the selection of the area and the selection of the replaceable liner, the first mobile unit including an unmanned aerial vehicle;

the first mobile structure communicating, via wireless communication, with a mobile device of a customer;

determining customer traffic information at the first mobile structure based on the communicating with the mobile device of the customer;

determining that the customer traffic information within the first mobile structure is greater than a threshold; and in response to determining that the customer traffic information within the first mobile structure is greater than the threshold, controlling a second mobile unit from the one or more mobile units, to autonomously navigate and carry a second mobile structure, from the one or more mobile structures, that includes a second replaceable liner to the area without human input.

2. The system of claim 1, wherein the controller is configured to perform operations further comprising determining the accessibility of the area based on at least one of accessibility by the first mobile unit to the area, parking spaces proximate to the area, a shape of the area, and a size of the area.

3. The system of claim 1, wherein the controller is configured to perform operations further comprising determining usability of the area based on at least one of information about co-tenants of the area, and information about facilities of the area.

4. The system of claim 1, wherein the data about the area includes at least one of a satellite image of the area and geographic information system data of the area.

5. The system of claim 1, wherein the controller is configured to perform operations further comprising:
transmitting information about the area to an entity in response to determining that the area is available for occupancy by the one or more mobile structures; and
updating the map including the area with an indication that the area is available for occupancy by the one or more mobile structures in response to receiving a permit for the area from the entity.

6. The system of claim 1, wherein the controller is configured to perform operations further comprising determining a foot traffic of the area.

7. The system of claim 1, wherein the controller is configured to perform operations further comprising determining an exposure, by social influencers, of the area.

8. The system of claim 1, wherein the controller is configured to perform operations further comprising determining an information about co-tenants of the area.

9. The system of claim 1, wherein the controller is configured to perform operations further comprising determining an information about amenities provided by a landlord of the area.

10. The system of claim 9, wherein the information about amenities includes at least one of locations of restrooms, electricity outlets, safety camera coverage, and parking availability.

11. The system of claim 1, wherein the controller is configured to perform operations further comprising determining at least one of a price of the area, a time availability of the area, and a theme of the area.

12. The system of claim 1, wherein the controller is configured to perform operations further comprising:
receiving a set of conditions from the user;
determining whether the area meets the set of conditions; and
notifying the user about the area, in response to determining that the area meets the set of conditions.

13. The system of claim 1, wherein the controller is configured to perform operations further comprising:
receiving an indication of interest in the area from the user; and
notifying a landlord of the area of the indication of interest from the user.

14. The system of claim 1, wherein the controller is configured to perform operations further comprising:
generating a schedule, and
controlling traveling of the first mobile unit that autonomously navigates to the area in accordance with the schedule.

15. The system of claim 14, wherein the replaceable liner includes an upper body interior liner.

16. The system of claim 1, further comprising one or more sensors configured to autonomously navigate the first mobile unit.

17. The system of claim 1, wherein the controller is configured to perform operations further comprising:
customizing assembly, via a graphical user interface, of the first mobile structure that is dependent on a property in the area, the assembly including configuration of a shape of the first mobile structure and modularity of the first mobile structure; and
controlling the first mobile unit to autonomously navigate to the property in the area to carry the first mobile structure in accordance with the customized assembly.

* * * * *